(12) United States Patent
Taylor, III et al.

(10) Patent No.: US 6,843,054 B2
(45) Date of Patent: Jan. 18, 2005

(54) METHOD AND APPARATUS FOR REMOVING NO$_X$ AND SOOT FROM ENGINE EXHAUST GAS

(75) Inventors: William Taylor, III, Columbus, IN (US); Samuel N. Crane, Jr., Columbus, IN (US); Yougen Kong, Columbus, IN (US)

(73) Assignee: Arvin Technologies, Inc., Troy, MI (US)

(*) Notice: Subject to any disclaimer, the term of this patent is extended or adjusted under 35 U.S.C. 154(b) by 0 days.

(21) Appl. No.: 10/345,654

(22) Filed: Jan. 16, 2003

(65) Prior Publication Data

US 2004/0139729 A1 Jul. 22, 2004

(51) Int. Cl.[7] ................................. F01N 3/00
(52) U.S. Cl. .................. 60/275; 60/274; 60/286; 60/288; 60/295; 60/297; 60/311
(58) Field of Search .................. 60/274, 275, 286, 60/287, 288, 295, 297, 303, 324, 311

(56) References Cited

U.S. PATENT DOCUMENTS

| | | |
|---|---|---|
| 2,787,730 A | 4/1957 | Berghaus et al. |
| 3,018,409 A | 1/1962 | Berghaus et al. |
| 3,035,205 A | 5/1962 | Berghaus et al. |
| 3,423,562 A | 1/1969 | Jones et al. |
| 3,594,609 A | 7/1971 | Vas |
| 3,622,493 A | 11/1971 | Crusco |
| 3,649,195 A | 3/1972 | Cook et al. |
| 3,755,131 A | 8/1973 | Shalit |
| 3,779,182 A | 12/1973 | Camacho |
| 3,841,239 A | 10/1974 | Nakamura et al. |
| 3,879,680 A | 4/1975 | Naismith et al. |
| 3,894,605 A | 7/1975 | Salvadorini |
| 3,982,962 A | 9/1976 | Bloomfield |
| 3,992,277 A | 11/1976 | Trieschmann et al. |

(List continued on next page.)

FOREIGN PATENT DOCUMENTS

| | | |
|---|---|---|
| DE | 237120 A1 | 6/1924 |
| DE | 30 48 540 | 7/1982 |
| DE | 237120 A1 | 7/1986 |
| DE | 195 10 804 | 9/1996 |
| DE | 19644864 A1 | 5/1998 |
| DE | 19644864 | 5/1998 |
| DE | 197 57 936 | 7/1999 |
| DE | 19927518 | 1/2001 |

(List continued on next page.)

OTHER PUBLICATIONS

Jahn, "Physics of Electric Propulsion", pp. 126–130 (1968).
Belogub et al., "Petrol–Hydrogen Truck With Load–Carrying Capacity 5 Tons", Int. J. Hydrogen Energy, vol. 16, No. 6, pp. 423–426 (1991).

(List continued on next page.)

*Primary Examiner*—Tu M. Nguyen
(74) *Attorney, Agent, or Firm*—Barnes & Thornburg

(57) ABSTRACT

An emission abatement assembly includes a pair of NO$_x$ traps arranged in a parallel arrangement. A fuel reformer generates a reductant fluid in the form of a reformate gas which is selectively supplied one of the traps during regeneration thereof. During regeneration of the trap, engine exhaust gas is directed through the other trap. A catalyzed soot filter is positioned downstream of the NO$_x$ traps. A method of operating an emission abatement assembly is also disclosed.

18 Claims, 8 Drawing Sheets

U.S. PATENT DOCUMENTS

| | | | |
|---|---|---|---|
| 4,033,133 A | | 7/1977 | Houseman et al. |
| 4,036,131 A | | 7/1977 | Elmore |
| 4,036,181 A | | 7/1977 | Matovich |
| 4,059,416 A | | 11/1977 | Matovich |
| 4,099,489 A | | 7/1978 | Bradley |
| 4,144,444 A | | 3/1979 | Dementiev et al. |
| 4,168,296 A | | 9/1979 | Lundquist |
| 4,339,546 A | | 7/1982 | Randalls |
| 4,436,793 A | | 3/1984 | Adlhart |
| 4,458,634 A | | 7/1984 | Carr et al. |
| 4,469,932 A | | 9/1984 | Spiegelberg et al. |
| 4,473,622 A | | 9/1984 | Chludzinski et al. |
| 4,522,894 A | | 6/1985 | Hwang et al. |
| 4,578,955 A | | 4/1986 | Medina |
| 4,625,511 A | | 12/1986 | Scheitlin et al. |
| 4,625,681 A | | 12/1986 | Sutekiyo |
| 4,645,521 A | | 2/1987 | Freesh |
| 4,651,524 A | | 3/1987 | Brighton |
| 4,657,829 A | | 4/1987 | McElroy et al. |
| 4,830,492 A | | 5/1989 | Ko |
| 4,841,925 A | | 6/1989 | Ward |
| 4,928,227 A | | 5/1990 | Burba et al. |
| 4,963,792 A | | 10/1990 | Parker |
| 4,967,118 A | | 10/1990 | Urataki et al. |
| 5,085,049 A | * | 2/1992 | Rim et al. ............ 60/274 |
| 5,095,247 A | | 3/1992 | Hanamura |
| 5,138,959 A | | 8/1992 | Kulkarni |
| 5,910,097 A | * | 6/1999 | Boegner et al. ............ 60/278 |
| 5,974,791 A | * | 11/1999 | Hirota et al. ............ 60/276 |
| 6,105,365 A | * | 8/2000 | Deeba et al. ............ 60/274 |
| 6,170,259 B1 | * | 1/2001 | Boegner et al. ............ 60/286 |
| 6,176,078 B1 | * | 1/2001 | Balko et al. ............ 60/274 |
| 6,560,958 B1 | * | 5/2003 | Bromberg et al. ............ 60/275 |
| 6,679,051 B1 | * | 1/2004 | van Nieustadt et al. ...... 60/286 |
| 2002/0012618 A1 | | 1/2002 | Bromberg et al. |
| 2002/0194835 A1 | | 12/2002 | Bromberg et al. |
| 2003/0066287 A1 | * | 4/2003 | Hirota et al. ............ 60/297 |
| 2003/0074893 A1 | * | 4/2003 | Webb et al. ............ 60/285 |
| 2004/0006977 A1 | * | 1/2004 | Nakatani et al. ............ 60/288 |

FOREIGN PATENT DOCUMENTS

| | | |
|---|---|---|
| EP | 0096538 | 12/1983 |
| EP | 0153116 | 8/1985 |
| EP | 0485922 A1 | 5/1992 |
| EP | 1030395 | 8/2000 |
| EP | 1057998 | 12/2000 |
| FR | 2593493 | 7/1987 |
| FR | 2620436 | 3/1989 |
| GB | 355210 | 2/1930 |
| GB | 1221317 | 2/1971 |
| GB | 2241746 | 9/1991 |
| JP | 51 27630 A2 | 3/1976 |
| JP | 51 27630 B4 | 8/1976 |
| JP | 02 121300 | 5/1990 |
| JP | 03195305 | 8/1991 |
| JP | 05 231242 | 9/1993 |
| JP | 07 292372 | 11/1995 |
| SU | 1519762 | 11/1989 |
| WO | WO 85/00159 | 1/1985 |
| WO | WO 94/03263 | 2/1994 |
| WO | WO 95/06194 | 3/1995 |
| WO | WO 96/24441 | 8/1996 |
| WO | WO 98/45582 | 10/1998 |
| WO | WO 00/26518 | 5/2000 |
| WO | WO 01/14698 A1 | 3/2001 |
| WO | WO 01/14702 A1 | 3/2001 |
| WO | WO 01/33056 A1 | 5/2001 |

OTHER PUBLICATIONS

Breshears et al., "Partial Hydrogen Injection Into Internal Combustion Engines", Proceedings of the EPA $1^{st}$ Symposium on Low Pollution Power Systems and Development, Ann Arbor, MI, pp. 268–277 (Oct. 1973).

Chuvelliov et al., "Comparison of Alternative Energy Technologies Utilizing Fossil Fuels and Hydrogen Based on Their Damage to Population and Environment in the USSR and East Europe", pp. 269–300.

Correa, "Lean Premixed Combustion for Gas–Turbines: Review and Required Research", PD–vol. 33, Fossil Fuel Combustion, ASME, pp. 1–9 (1991).

Czernichowski et al., "Multi–Electrodes High Pressure Gliding Discharge Reactor and its Applications for Some Waste Gas and Vapor Incineration", Proceedings of Workshop on Plasma Destruction of Wastes, France, pp. 1–13 (1990).

Das, "Exhaust Emission Characterization of Hydrogen–Operated Engine System: Nature of Pollutants and their Control Techniques", Int. J. Hydrogen Energy, vol. 16, No. 11, pp. 765–775 (1991).

Das, "Hydrogen Engines: A View of the Past and a Look into the Future", Int. J. of Hydrogen Energy, vol. 15, No. 6, pp. 425–443 (1990).

Das, "Fuel Induction Techniques for a Hydrogen Operated Engine", Int. J. of Hydrogen Energy, vol. 15, No. 11 (1990).

DeLuchi, "Hydrogen Vehicles: An Evaluation of Fuel Storage, Performance, Safety, Environmental Implants and Costs", Int. J. Hydrogen Energy, vol. 14, No. 2, pp. 81–130 (1989).

Duclos et al., "Diagnostic Studies on a Pinch Plasma Accelerator", AIAA Journal, vol. 1, No. 11, pp. 2505–2513 (Nov. 1963).

Feucht et al., "Hydrogen Drive for Road Vehicles—Results from the Fleet Test Run in Berlin", Int. J. Hydrogen Energy, vol. 13, No. 4, pp. 243–250 (1988).

Finegold et al., "Dissociated Methanol as a Consumable Hydride for Automobiles and Gas Turbines", pp. 1359–1369, Advances in Hydrogen Energy 3 (Jun. 13–17, 1982).

Hall et al., "Initial Studies of a New Type of Ignitor: The Railplug"—SAE Paper 912319, pp. 1730–1746 (1991).

Houseman et al., "Hydrogen Engines Based On Liquid Fuels, A Review", G.E., Proc., $3^{rd}$ World Hydrogen Energy Conf., pp. 949–968 (1980).

Houseman, et al., "Two Stage Combustion for Low Emissions Without Catalytic Converters", Proc. of Automobile Engineering Meeting, Dearborn, MI, pp. 1–9 (Oct. 18–22, 1976).

Jones, et al., "Exhaust Gas Reforming of Hydrocarbon Fuels", Soc. of Automotive Engineers, Paper 931086, pp. 223–224 (1993).

Kaske et al., "Hydrogen Production by the Hüls Plasma–Reforming Process", Proc. VI World Hydrogen Energy Conference, vol. 1, pp. 185–190 (1986).

MacDonald, "Evaluation of Hydrogen–Supplemented Fuel Concept with an Experimental Multi–Cylinder Engine", Society of Automotive Engineers, Paper 760101, pp. 1–16 (1976).

Mackay, "Development of a 24 kW Gas Turbine–Driven Generator Set for Hybrid Vehicles", 940510, pp. 99–105, NoMac Energy Systems, Inc.

Mackay, "Hybrid Vehicle Gas Turbines", 930044, pp. 35–41, NoMac Energy Systems, Inc.

Matthews et al., "Further Analysis of Railplugs as a New Type of Ignitor", SAE Paper 922167, pp. 1851–1862 (1992).

Mishchenko et al., "Hydrogen as a Fuel for Road Vehicles", Proc. VII World Hydrogen Energy Conference, vol. 3, pp. 2037–2056 (1988).

Monroe et al., "Evaluation of a Cu/Zeolite Catalyst to Remove $No_x$ from Lean Exhaust", Society of Automotive Engineers, Paper 930737, pp. 195–203 (1993).

Rabinovich et al., "On Board Plasmatron Generation of Hydrogen Rich Gas for Engine Pollution Reduction", Proceedings of NIST Workshop on Advanced Components for Electric and Hybrid Electric Vehicles, Gaithersburg, MD, pp. 83–88 (Oct. 1993) (not published).

Rabinovich et al., "Plasmatron Internal Combustion Engine System for Vehicle Pollution Reduction", Int. J. of Vehicle Design, vol. 15, Nos. 3/4/5, pp. 234–242 (1994).

Scott et al., "Hydrogen Fuel Breakthrough with On–Demand Gas Generator", 372 Automotive Engineering, vol. 93, No. 8, Warrendale, PA, U.S.A., pp. 81–84 (Aug. 1985).

Shabalina et al., "Slag Cleaning by Use of Plasma Heating", pp. 1–7.

Handbook of Thermodynamic High Temperature Process Data, pp. 507–547.

Varde et al., "Reduction of Soot in Diesel Combustion with Hydrogen and Different H/C Gaseous Fuels", Hydrogen Energy Progress V, pp. 1631–1639.

Wang et al., "Emission Control Cost Effectiveness of Alternative–Fuel Vehicles", Society of Automotive Engineers, Paper 931786, pp. 91–122 (1993).

Wilson, "Turbine Cars", Technology Review, pp. 50–56 (Feb./Mar., 1995).

Tachtler, "Fuel Cell Auxiliary Power Unit—Innovation for the Electric Supply of Passenger Cars?", Society of Automotive Engineers, Paper No. 2000–01–0374, pp. 109–117 (2000).

Kirwan, "Fast Start–Up On–Board Gasoline Reformer for Near Zero Emissions in Spark–Ignition Engines", Society of Automotive Engineers World Congress, Detroit, MI, (Mar. 4–7, 2002), Paper No. 2002–01–1011.

Bromberg, "Emissions Reductions Using Hydrogen from Plasmatron Fuel Converters", Int. J. of Hydrogen Energy 26, pp. 1115–1121 (2001).

Bromberg, "Experimental Evaluation of SI Engine Operation Supplemented by Hydrogen Rich Gas from a Compact Plasma Boosted Reformer", Massachusetts Institute of Technology Plasma Science and Fusion Center Report, JA–99–32 (1999).

Bromberg, "Compact Plasmatron–Boosted Hydrogen Generation Technology for Vehicular Applications", Int. J. of Hydrogen Energy 24, pp 341–350 (1999).

Gore, "Hydrogen A Go–Go", Discover, p. 92–93, (Jul., 1999).

Burch, "An Investigation of the $NO/H_2/O_2$ Reaction on Noble–Metal Catalysts at Low Temperatures Under Lean–Burn Conditions," Journal of Applied Catalysis B: Environmental 23, pp. 115–121 (1999).

Costa, "An Investigation of the $No/H_2/O_2$ (Lean De–$No_x$) Reaction on a Highly Active and Selective $Pt/La_{0.7}Sr_{0.2}Ce_{0.1}FeO_3$ Catalyst at Low Temperatures", Journal of Catalysis 209, pp. 456–471 (2002).

Kirwan, "Development of a Fast Start–up O Gasoline Reformer for Near Zero Spark–Ignition Engines", Delphi Automotive Systems, pp. 1–21 (2002).

Shelef, "Twenty–five Years after Introduction of Automotive Catalysts: What Next?" Journal of Catalysis Today 62, pp. 35–50 (2000).

Koebel, "Selective Catalytic Reduction of NO and $NO_2$ at Low Temperatures", Journal of Catalysis Today 73, pp. 239–247 (2002).

Frank, "Kinetics and Mechanism of the Reduction of Nitric Oxides by $H_2$ Under Lean–Burn Conditions on a Pt–Mo–Co/ $\alpha$–$Al_2O_3$ Catalyst", Journal of Applied Catalysis B: Environmental 19, pp. 45–57 (1998).

Nanba, "Product Analysis of Selective Catalytic Reduction of $NO_2$ with $C_2H_4$ Over H–Ferrierite", Journal of Catalysis 211, pp. 53–63 (2002).

Simanaitis, "Whither the Automobile?", Road and Track, pp. 98–102 (Sep. 2001).

Stokes, "A Gasoline Engine Concept for Improved Fuel Economy—The Lean Boost System", International Falls Fuels and Lubricants Meeting and Exposition, Baltimore, MD, SAE Technical Series, 14 pages (Oct. 16–19, 2000).

"$No_x$ Emission Control for Light–Duty CIDI Vehicles," Department of Energy, Apr. 2001 (2 pages).

* cited by examiner

METHOD AND APPARATUS FOR REMOVING $NO_x$ AND SOOT FROM ENGINE EXHAUST GAS

CROSS REFERENCE

Cross reference is made to copending U.S. patent application Ser. No. 10/246,118 entitled "Combination Emission Abatement Assembly and Method of Operating the Same" which was filed on Sep. 18, 2002, is assigned to the same assignee as the present application, and is hereby incorporated by reference. Cross reference is also made to copending U.S. patent application Ser. No. 10/345,681 entitled "Method and Apparatus for Directing Exhaust Gas and Reductant Fluid in an Emission Abatement System" which is assigned to the same assignee as the present application, filed concurrently herewith, and hereby incorporated by reference.

FIELD OF THE DISCLOSURE

The present disclosure relates to generally to emission abatement systems, and more particularly to emission abatement systems which utilize reductant fluids to regenerate emission abatement devices.

BACKGROUND OF THE DISCLOSURE

Devices for removing $NO_x$ from the exhaust gas of an internal combustion engine may be embodied as traps for removing $NO_x$ from the exhaust gas by "trapping" the $NO_x$ as the exhaust gas advances therethrough. Such a $NO_x$ trap must be periodically regenerated to purge the trap of the trapped $NO_x$. To do so, the $NO_x$ trap periodically undergoes a catalytic reaction in which the trapped $NO_x$ is converted to less harmful gases that are subsequently exhausted from the trap.

Reductant fluids may be utilized to facilitate such regeneration of the trap. Reductant fluids may take a number of different forms. For example, liquids such as untreated diesel fuel may be used as a reductant fluid. Alternatively, gases such as hydrogen gas or carbon monoxide gas may also be used as a reductant fluid.

One way to generate a gaseous reductant fluid is by use of an onboard fuel reformer. A fuel reformer is operated to reform a hydrocarbon fuel into a reformate gas. In the case of an onboard fuel reformer, such as a fuel reformer associated with a vehicle or a stationary power generator, the reformate gas produced by the fuel reformer may be utilized as the reductant fluid to regenerate or otherwise condition an emission abatement device associated with an internal combustion engine such as a $NO_x$ trap.

SUMMARY OF THE DISCLOSURE

According to one aspect of the present disclosure, there is provided a an emission abatement assembly. The emission abatement assembly includes a pair of $NO_x$ traps arranged in a parallel arrangement. A fuel reformer generates a reductant fluid in the form of a reformate gas which is selectively supplied one of the traps during regeneration thereof. During regeneration of the trap, engine exhaust gas is directed through the other trap. A catalyzed soot filter is positioned downstream of the $NO_x$ traps.

The catalyzed soot filter may be regenerated with heat from the engine exhaust gas. The catalyzed soot filter may also be regenerated with reformate gas from the fuel reformer by advancing the reformate gas into contact with an oxidation catalyst to generate heat for igniting the soot trapped in the filter.

The fuel reformer may be embodied as a plasma fuel reformer.

According to another aspect of the present disclosure, there is provided a method of operating an emission abatement assembly. The method includes the step of regenerating a first $NO_x$ trap with reformate gas from a fuel reformer while engine exhaust gas is advanced through a second $NO_x$ trap. Exhaust gas exiting the second $NO_x$ trap is then advanced through a catalyzed soot filter.

The method may include regenerating the catalyzed soot filter with heat from the exhaust gas. The method may also include regenerating the catalyzed soot filter by advancing reformate gas from the fuel reformer into contact with an oxidation catalyst to generate heat for igniting the soot trapped in the filter.

According to a further aspect of the present disclosure, there is provided a diverter valve for diverting both engine exhaust gas and a reductant fluid between a number of emission abatement devices.

The valve may be used to divert engine exhaust gas to a first $NO_x$ trap while contemporaneously diverting reductant fluid to a second $NO_x$ trap.

According to another aspect of the present disclosure, there is provided a method of operating a diverter valve of an emission abatement assembly. The method includes positioning the diverter valve between a number of different valve positions to selectively divert both engine exhaust gas and a reductant fluid between a number of different emission abatement devices.

The above and other features of the present disclosure will become apparent from the following description and the attached drawings.

DETAILED DESCRIPTION OF THE DRAWINGS

As will herein be described in more detail, a fuel reformer, according to the concepts of the present disclosure, may be utilized to regenerate or otherwise condition an emission abatement assembly having a number of different devices for treating a number of different exhaust effluents from the exhaust gas of an internal combustion engine. For example, a fuel reformer may be operated to generate and supply a reductant fluid in the form of a reformats gas to a pair of $NO_x$ traps. Reformate gas from the fuel reformer may also be utilized to regenerate a catalyzed soot filter.

According to additional concepts of the present disclosure, a diverter valve may be utilized to divert not only engine exhaust gas, but also reductant fluid between a number of different emission abatement devices. In such a way, the need for multiple flow valves is eliminated.

The fuel reformer described herein may be embodied as any type of fuel reformer such as, for example, a catalytic fuel reformer, a thermal fuel reformer, a steam fuel reformer, or any other type of partial oxidation fuel reformer. The fuel reformer of the present disclosure may also be embodied as a plasma fuel reformer. A plasma fuel reformer uses plasma to convert a mixture of air and hydrocarbon fuel into a reformate gas which is rich in, amongst other things, hydrogen gas and carbon monoxide. Systems including plasma fuel reformers are disclosed in U.S. Pat. No. 5,425,332 issued to Rabinovich et al.; U.S. Pat. No. 5,437,250 issued to Rabinovich et al.; U.S. Pat. No. 5,409,784 issued to Bromberg et al.; and U.S. Pat. No. 5,887,554 issued to Cohn, et al., the disclosures of each of which is hereby incorporated by reference.

For purposes of the following description, the concepts of the present disclosure will herein be described in regard to a plasma fuel reformer. However, as described above, the fuel reformer of the present disclosure may be embodied as any type of fuel reformer, and the claims attached hereto should not be interpreted to be limited to any particular type of fuel reformer unless expressly defined therein.

Figure 1:
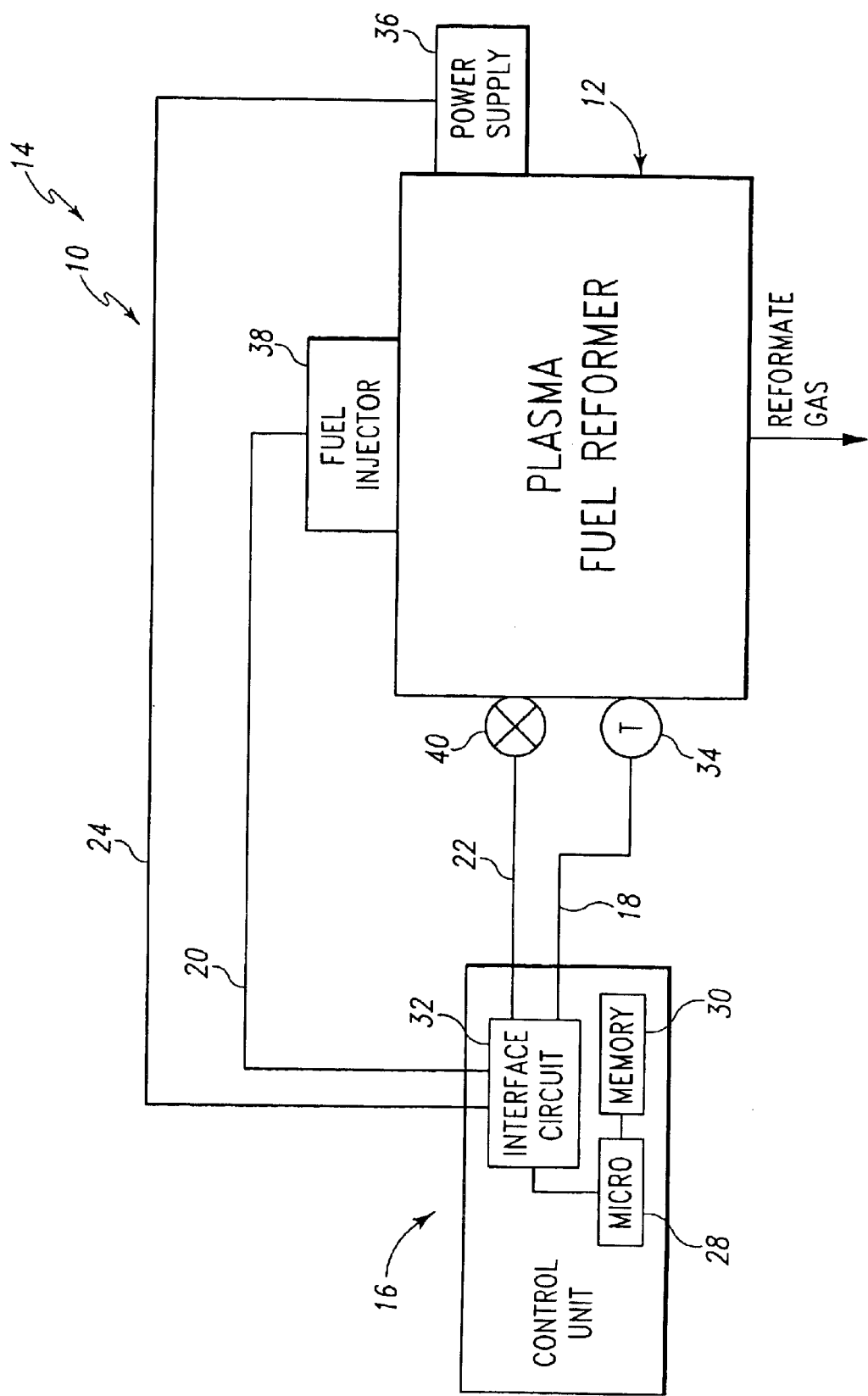
FIG. 1 is a simplified block diagram of a fuel reforming assembly having a plasma fuel reformer under the control of an electronic control unit.
Figure 2:
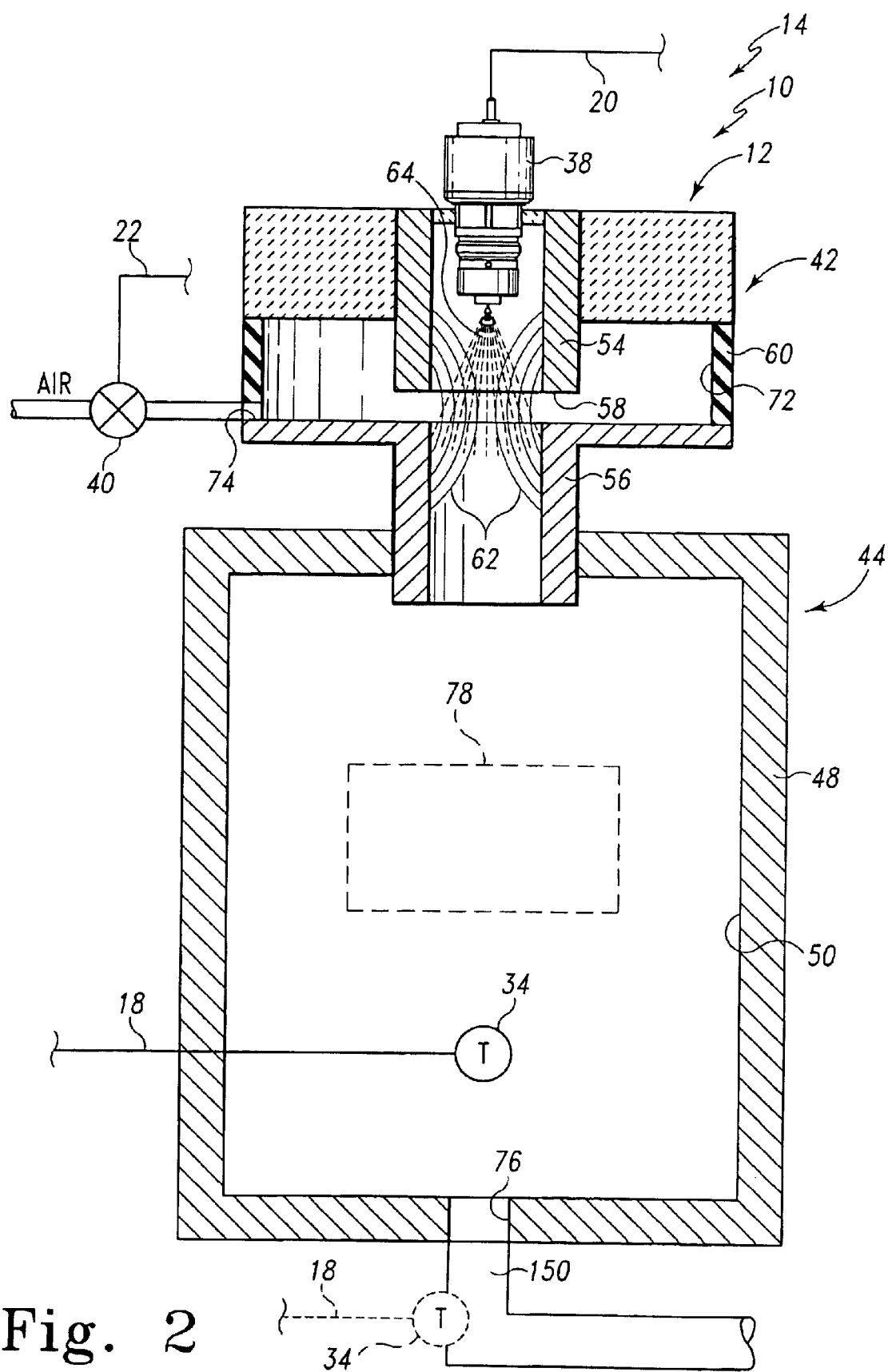
FIG. 2 is a diagrammatic cross sectional view of the plasma fuel reformer of FIG. 1.

Referring now to FIGS. 1 and 2, there is shown an exemplary embodiment of a plasma fuel reforming assembly 10 of an emission abatement assembly 14. The plasma fuel reforming assembly includes a plasma fuel reformer 12 and a control unit 16. The plasma fuel reformer 12 reforms (i.e., converts) hydrocarbon fuels into a reformate gas that includes, amongst other things, hydrogen and carbon monoxide. As such, the plasma fuel reformer 12, as described further herein, may be used in the construction of an onboard fuel reforming system of a vehicle or a stationary power generator. In such a way, the reformate gas produced by the onboard plasma fuel reformer 12 may be utilized as a reductant fluid to regenerate or otherwise condition an emission abatement device associated with an internal combustion engine (e.g., a diesel engine or a gasoline engine).

As shown in FIG. 2, the plasma fuel reformer 12 includes a plasma-generating assembly 42 and a reactor 44. The reactor 44 includes a reactor housing 48 having a reaction chamber 50 defined therein. The plasma-generating assembly 42 is secured to an upper portion of the reactor housing 48. The plasma-generating assembly 42 includes an upper electrode 54 and a lower electrode 56. The electrodes 54, 56 are spaced apart from one another so as to define an electrode gap 58 therebetween. An insulator 60 electrically insulates the electrodes from one another.

The electrodes 54, 56 are electrically coupled to an electrical power supply 36 (see FIG. 1) such that, when energized, an electrical current is supplied to one of the electrodes thereby generating a plasma arc 62 across the electrode gap 58 (i.e., between the electrodes 54, 56). A fuel input mechanism such as a fuel injector 38 injects a hydrocarbon fuel 64 into the plasma arc 62. The fuel injector 38 may be any type of fuel injection mechanism which injects a desired amount of fuel into plasma-generating assembly 42. In certain configurations, it may be desirable to atomize the fuel prior to, or during, injection of the fuel into the plasma-generating assembly 42. Such fuel injector assemblies (i.e., injectors which atomize the fuel) are commercially available.

As shown in FIG. 2, the plasma-generating assembly 42 has an annular air chamber 72. Pressurized air is advanced into the air chamber 72 through an air inlet 74 and is thereafter directed radially inwardly through the electrode gap 58 so as to "bend" the plasma arc 62 inwardly. Such bending of the plasma arc 62 ensures that the injected fuel 64 is directed through the plasma arc 62. Such bending of the plasma arc 62 also reduces erosion of the electrodes 56, 58. Moreover, advancement of air into the electrode gap 58 also produces a desired mixture of air and fuel ("air/fuel mixture"). In particular, the plasma reformer 12 reforms or otherwise processes the fuel in the form of a mixture of air and fuel. The air-to-fuel ratio of the air/fuel mixture being reformed by the fuel reformer is controlled via control of the fuel injector 38 and an air inlet valve 40. The air inlet valve 40 may be embodied as any type of electronically-controlled air valve. The air inlet valve 40 may be embodied as a discrete device, as shown in FIG. 2, or may be integrated into the design of the plasma fuel reformer 12. In either case, the air inlet valve 40 controls the amount of air that is introduced into the plasma-generating assembly 42 thereby controlling the air-to-fuel ratio of the air/fuel mixture being processed by the plasma fuel reformer 12.

The lower electrode 56 extends downwardly into the reactor housing 48. As such, gas (either reformed or partially reformed) exiting the plasma arc 62 is advanced into the reaction chamber 50. A catalyst 78 may be positioned in the reaction chamber 50. The catalyst 78 completes the fuel reforming process, or otherwise treats the gas, prior to exit of the reformate gas through a gas outlet 76. In particular, some or all of the gas exiting the plasma-generating assembly 42 may only be partially reformed, and the catalyst 78 is configured to complete the reforming process (i.e., catalyze a reaction which completes the reforming process of the partially reformed gas exiting the plasma-generating assembly 42). The catalyst 78 may be embodied as any type of catalyst that is configured to catalyze such reactions. In one exemplary embodiment, the catalyst 78 is embodied as substrate having a precious metal or other type of catalytic material disposed thereon. Such a substrate may be constructed of ceramic, metal, or other suitable material. The catalytic material may be, for example, embodied as platinum, rhodium, palladium, including combinations thereof, along with any other similar catalytic materials. The plasma fuel reformer 12 may be embodied without the catalyst 78.

As shown in FIG. 2, the plasma fuel reformer 12 has a temperature sensor 34 associated therewith. The temperature sensor 34 is used as a feedback mechanism to determine the temperature of a desired structure of the plasma fuel reformer 12 or the gas advancing therethrough. For example, the temperature sensor 34 may be used to measure the temperature of the reformate gas being produced by the plasma fuel reformer 12, the ambient temperature within the reaction chamber 50, the temperature of the catalyst 78, etcetera. The temperature sensor 34 may be located in any number of locations. In particular, as shown in solid lines, the temperature sensor 34 may be positioned within the reaction chamber 50 at location in operative contact with the a structure (e.g., the catalyst 78 or the walls of the reaction chamber 50) or a substance (e.g., the gas in the reaction chamber 50). To do so, the temperature sensor 34 may be positioned in physical contact with the structure or substance, or may be positioned a predetermined distance away from the structure or out of the flow of the substance, depending on the type and configuration of the temperature sensor. In such a way, the temperature sensor 34 may function as a feedback mechanism for controlling operation of the plasma fuel reformer 12.

As shown in FIG. 1, the plasma fuel reformer 12 and its associated components are under the control of the control unit 16. In particular, the temperature sensor 34 is electrically coupled to the electronic control unit 16 via a signal line 18, the fuel injector 38 is electrically coupled to the electronic control unit 16 via a signal line 20, the air inlet valve 40 is electrically coupled to the electronic control unit 16 via a signal line 22, and the power supply 36 is electrically coupled to the electronic control unit 16 via a signal line 24. Moreover, as will herein be described in greater detail, a number of other components associated with the emission abatement assembly 14 may also be under the control of the control unit 16, and, as a result, electrically coupled thereto. For example, a flow diverter valve 88 for selectively diverting an exhaust gas flow from an internal combustion engine and a flow of reformate gas from the plasma fuel reformer 12 between any number of components may be under the control of the control unit 16. A number of sensors such as $NO_x$ sensors and pressure sensors associated with the emission abatement assembly 14 are also electrically coupled to the control unit 16.

Although the signal lines 18, 20, 22, 24 (and any of the signal lines used to couple other devices associated with the emission abatement assembly 14 to the control unit) are shown schematically as a single line, it should be appreciated that the signal lines may be configured as any type of signal carrying assembly which allows for the transmission of electrical signals in either one or both directions between the electronic control unit 16 and the corresponding component. For example, any one or more of the signal lines 18, 20, 22, 24 (or any other signal line disclosed herein) may be embodied as a wiring harness having a number of signal lines which transmit electrical signals between the electronic control unit 16 and the corresponding component. It should be appreciated that any number of other wiring configurations may also be used. For example, individual signal wires may be used, or a system utilizing a signal multiplexer may be used for the design of any one or more of the signal lines 18, 20, 22, 24 (or any other signal line). Moreover, the signal lines 18, 20, 22, 24 may be integrated such that a single harness or system is utilized to electrically couple some or all of the components associated with the plasma fuel reformer 12 to the electronic control unit 16.

The electronic control unit 16 is, in essence, the master computer responsible for interpreting electrical signals sent by sensors associated with the plasma fuel reformer 12 and for activating electronically-controlled components associated with the plasma fuel reformer 12 in order to control the plasma fuel reformer 12, the flow of reformate gas exiting therefrom, and an exhaust gas flow from an internal combustion engine. For example, the electronic control unit 16 of the present disclosure is operable to, amongst many other things, determine the beginning and end of each injection cycle of fuel into the plasma-generating assembly 42, calculate and control the amount and ratio of air and fuel to be introduced into the plasma-generating assembly 42, determine the temperature of the reformer 12 or the reformate gas, determine the power level to supply to the plasma fuel reformer 12, and determine which component (e.g., a $NO_x$ trap or a soot filter) to regenerate.

To do so, the electronic control unit 16 includes a number of electronic components commonly associated with electronic units which are utilized in the control of electromechanical systems. For example, the electronic control unit 16 may include, amongst other components customarily included in such devices, a processor such as a microprocessor 28 and a memory device 30 such as a programmable read-only memory device ("PROM") including erasable PROM's (EPROM's or EEPROM's). The memory device 30 is configured to store, amongst other things, instructions in the form of, for example, a software routine (or routines) which, when executed by the processor 28, allows the electronic control unit 16 to control operation of the plasma fuel reformer 12 and other devices associated with the emission abatement assembly 14.

The electronic control unit 16 also includes an analog interface circuit 32. The analog interface circuit 32 converts the output signals from the various fuel reformer sensors (e.g., the temperature sensor 34) or other sensors associated with the with the emission abatement assembly (e.g., the $NO_x$ sensor and the pressure sensors) into a signal which is suitable for presentation to an input of the microprocessor 28. In particular, the analog interface circuit 32, by use of an analog-to-digital (A/D) converter (not shown) or the like, converts the analog signals generated by the sensors into a digital signal for use by the microprocessor 28. It should be appreciated that the A/D converter may be embodied as a discrete device or number of devices, or may be integrated into the microprocessor 28. It should also be appreciated that if any one or more of the sensors associated with the plasma fuel reformer 12 or the emission abatement assembly 14 generate a digital output signal, the analog interface circuit 32 may be bypassed.

Similarly, the analog interface circuit 32 converts signals from the microprocessor 28 into an output signal which is suitable for presentation to the electrically-controlled components associated with the plasma fuel reformer 12 (e.g., the fuel injector 38, the air inlet valve 40, the power supply 36), or other system components associated with the emission abatement assembly 14 (e.g., the diverter valve 88). In particular, the analog interface circuit 32, by use of a digital-to-analog (D/A) converter (not shown) or the like, converts the digital signals generated by the microprocessor 28 into analog signals for use by the electronically-controlled components associated with the fuel reformer 12 and the emission abatement assembly 14. It should be appreciated that, similar to the A/D converter described above, the D/A converter may be embodied as a discrete device or number of devices, or may be integrated into the microprocessor 28. It should also be appreciated that if any one or more of the electronically-controlled components associated with the plasma fuel reformer 12 or the emission abatement assembly 14 operate on a digital input signal, the analog interface circuit 32 may be bypassed.

Hence, the electronic control unit 16 may be operated to control operation of the plasma fuel reformer 12, and components associated therewith, and the components associated with the emission abatement assembly 14. In particular, the electronic control unit 16 executes a routine including, amongst other things, a closed-loop control scheme in which the electronic control unit 16 monitors the outputs from a number of sensors in order to control the inputs to the electronically-controlled components associated therewith. To do so, the electronic control unit 16 communicates with the sensors associated with the fuel reformer 12 and the emission abatement assembly 14 to determine, amongst numerous other things, the amount, temperature, and/or pressure of air and/or fuel being supplied to the plasma fuel reformer 12, the amount of hydrogen and/or oxygen in the reformate gas, the temperature of the reformer or the reformate gas, the composition of the reformate gas, the accumulation level within an emission abatement device (e.g., a $NO_x$ trap or soot filter), etcetera. Armed with this data, the electronic control unit 16 performs numerous calculations each second, including looking up values in preprogrammed tables, in order to execute algorithms to perform such functions as determining when or how long the fuel reformer's fuel injector or other fuel input device is opened, controlling the power level input to the fuel reformer, controlling the amount of air advanced through air inlet valve, controlling the position of a flow diverter valve responsible for directing the flow of reformate gas and exhaust gas to one component or the other, determining the quantity and/or composition of reformate gas to generate and deliver to a particular component, etcetera.

Figure 3:
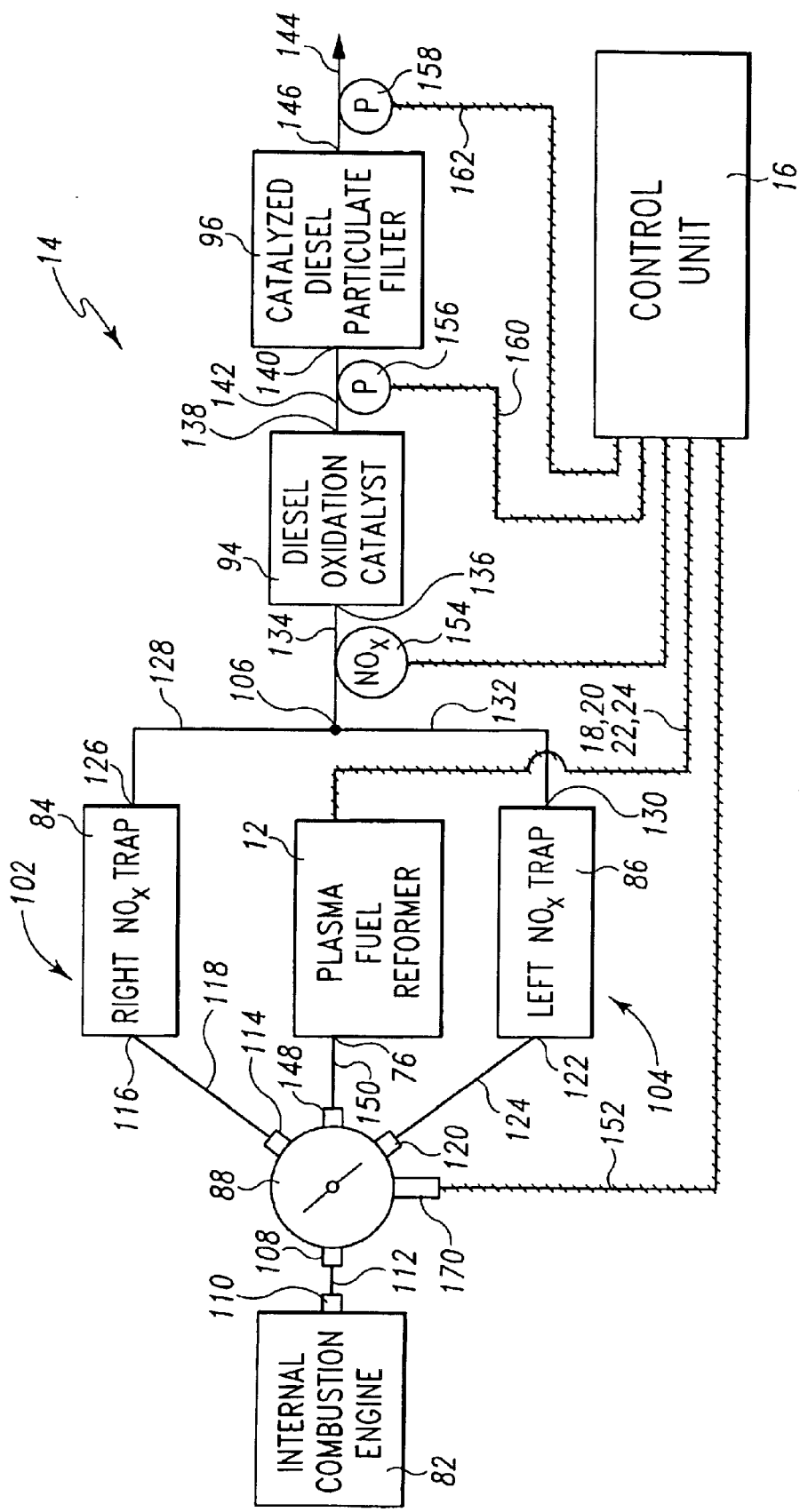
FIG. 3 is a simplified block diagram of an emission abatement assembly.

Referring now to FIG. 3, there is shown the emission abatement assembly 14 in greater detail. The emission abatement assembly 14 includes a pair of $NO_x$ traps 84, 86 for removing and treating $NO_x$ present in the exhaust gas from an internal combustion engine 82 such as a diesel engine, a gasoline engine, a gasoline direct injection (GDI) engine, or natural gas engine. The $NO_x$ traps 84, 86 are arranged in a parallel relationship with one another. As such, for purposes of clarity of description, the $NO_x$ trap 84 will herein be referred to as the right $NO_x$ trap, whereas the $NO_x$ trap 86 will herein be referred to as the left $NO_x$ trap. However, such use of directional terms (i.e., right and left) is not intended to infer any particular orientation, but rather is only used herein only for ease of description.

The $NO_x$ traps 84, 86 may be any type of commercially available $NO_x$ trap, including a lean $NO_x$ trap, which facilitates the trapping and removal of $NO_x$ in the lean conditions associated with exhaust gases from diesel engines, GDI engines, or natural gas engines. Specific examples of $NO_x$ traps which may be used as the $NO_x$ traps 84, 86 of the present disclosure include, but are not limited to, $NO_x$ traps commercially available from, or $NO_x$ traps constructed with materials commercially available from, EmeraChem, LLC of Knoxville, Tenn. (formerly known as Goal Line Environmental Technologies, LLC of Knoxville, Tenn.).

The emission abatement assembly 14 also includes an oxidation catalyst 94 and a catalyzed soot filter 96. The catalyst 94 may be embodied as any type of catalyst that is configured to catalyze oxidation reactions in an exhaust gas stream. In one exemplary embodiment, the catalyst 94 is embodied as substrate having a precious metal or other type of catalytic material disposed thereon. Such a substrate may be constructed of ceramic, metal, or other suitable material. The catalytic material may be, for example, embodied as platinum, rhodium, palladium, including combinations thereof, along with any other similar catalytic materials. When positioned downstream of the $NO_x$ traps 84, 86, the catalyst 94 may function to clean up any hydrogen or hydrocarbon "slip" from the $NO_x$ traps 84, 86. For example, the oxidation catalyst 94 may be used to oxidize any $H_2$, certain hydrocarbons, or $H_2S$ that may be present in the gases exiting the traps 84, 86. Moreover, as will be discussed herein in greater detail, when positioned upstream of the soot filter 96, the catalyst 94 may be utilized during assisted regeneration of soot filter 96.

The soot filter 96 may be embodied as any type of commercially available particulate filter. For example, the soot particulate filter may be embodied as any known exhaust particulate filter such as a "deep bed" or "wall flow" filter. Deep bed filters may be embodied as metallic mesh filters, metallic or ceramic foam filters, ceramic fiber mesh filters, and the like. Wall flow filters, on the other hand, may be embodied as a cordierite or silicon carbide ceramic filter with alternating channels plugged at the front and rear of the filter thereby forcing the gas advancing therethrough into one channel, through the walls, and out another channel.

The soot filter 96 is impregnated with a catalytic material. The catalytic material may be, for example, embodied as platinum, rhodium, palladium, including combinations thereof, along with any other similar catalytic materials. By use of catalytic material, the temperature at which soot particles trapped in the filter combust is lowered such that regeneration of the soot filter 96 may occur in the presence of the heat of the engine exhaust gas. However, as will be discussed in greater detail herein, if the soot accumulation level within the soot filter 96 reaches a predetermined level (i.e., regeneration based on exhaust gas heat alone is not sufficient to clear the filter), reformate gas from the fuel reformer 12 may be used to regenerate the filter.

As shown in FIG. 3, a diverter valve 88 selectively diverts the flow of exhausts gas from the engine 82 between the traps 84, 86. In particular, the diverter valve 88 may be operated to divert a flow of exhaust gas from the engine 82 between a right flow path 102 and a left flow path 104. The right $NO_x$ trap 84 is positioned in the right flow path 102 such that exhaust gas or reformate gas advancing through the right flow path 102 is advanced through the right $NO_x$ trap 84. The left $NO_x$ trap 86 is positioned in the left flow path 104 such that exhaust gas or reformate gas advancing through the left flow path 104 is advanced through the left $NO_x$ trap 86.

As also shown in FIG. 3, the right flow path 102 and the left flow path 104 are recombined by a flow coupler 106. The flow coupler 106 is positioned downstream of the $NO_x$ traps 84, 86 and upstream of oxidation catalyst 94 and the soot filter 96. As a result, gas exiting the $NO_x$ traps 84, 86 is directed through both the oxidation catalyst 94 and the soot filter 96.

In the exemplary embodiment described herein, a number of fluid lines such as pipes, tubes, or the like are utilized to create the various flow paths. In particular, an exhaust gas inlet 108 of the diverter valve 88 is fluidly coupled to an exhaust manifold 110 of the engine 82 via a fluid line 112. A right outlet 114 of the diverter valve 88 is fluidly coupled to an inlet 116 of the right $NO_x$ trap 84 via a fluid line 118, whereas a left outlet 120 of the diverter valve 88 is fluidly coupled to an inlet 122 of the left $NO_x$ trap 86 via a fluid line 124. An outlet 126 of the right $NO_x$ trap 84 is fluidly coupled to the flow coupler 106 via a fluid line 128, whereas an outlet 130 of the left $NO_x$ trap 86 is fluidly coupled to the flow coupler 106 via the fluid line 132. A fluid line 134 fluidly couples the flow coupler 106 to an inlet 136 of the oxidation catalyst 94. An outlet 138 of the oxidation catalyst 94 is fluidly coupled to an inlet 140 of the soot filter 96 via a fluid line 142. Via a fluid line 144, an outlet 146 of the soot filter 96 is either open to the atmosphere or coupled to an additional exhaust system component (not shown) positioned downstream of the soot filter 96.

In such a configuration, exhaust gas from the engine 82 may be routed through the emission abatement assembly 14 to remove, amongst other things, $NO_x$ and soot therefrom. To do so, exhaust gas may be selectively routed between the two $NO_x$ traps 84, 86 to allow for both treatment of the exhaust gas and trap regeneration. For example, exhaust gas may be routed through the right $NO_x$ trap 84 while the left $NO_x$ trap 86 is maintained "offline." While offline, the left $NO_x$ trap 86 may undergo regeneration. In such a case, exhaust gas is advanced along a fluid path which includes the fluid line 112 from the exhaust manifold 110, the diverter valve 88, the fluid line 118 to the right $NO_x$ trap 84, through the trap 84 and the fluid line 128 to the flow coupler 106, the fluid line 134 to the oxidation catalyst 94, through the catalyst 94 and the fluid line 142 to the soot filter 96, through the soot filter 96 and out the fluid line 144.

Once the left $NO_x$ trap 86 has been regenerated, the position of the diverter valve 88 may be switched such that exhaust gas from the engine 82 is routed through the left $NO_x$ trap 86 while the right $NO_x$ trap 84 is offline for regeneration. In this case, exhaust gas is advanced along a fluid path which includes the fluid line 112 from the exhaust manifold 10, the diverter valve 88, the fluid line 124 to the left $NO_x$ trap 86, through the trap 86 and the fluid line 132 to the flow coupler 106, the fluid line 134 to the oxidation catalyst 94, through the catalyst 94 and the fluid line 142 to the soot filter 96, through the soot filter 96 and out the fluid line 144.

As will be discussed herein in greater detail, in addition to diverting exhaust gas from the engine 82 to the appropriate $NO_x$ trap 84, 86, the diverter valve 88 is also configured to divert reformate gas from the fuel reformer 12 to the appropriate $NO_x$ trap 84, 86. In particular, the outlet 76 (see FIG. 2) of the fuel reformer 12 is fluidly coupled to a reductant fluid inlet 148 of the diverter valve 88 via a fluid line 150. The diverter valve 88 diverts reformate gas from the fuel reformer 12 to the offline $NO_x$ trap 84, 86. In particular, as described above, engine exhaust gas is routed by the diverter valve 88 through one of the traps 84, 86 while the other trap is maintained offline for regeneration. The diverter valve 88 routes engine exhaust gas through one of the traps 84, 86, while routing reformate gas from the fuel reformer 12 through the other trap 84, 86.

The diverter valve 88 is electrically coupled to the electronic control unit 16 via a signal line 152. As such, the position of the diverter valve 88 is under the control of the electronic control unit 16. Hence, the electronic control unit 16, amongst its other functions, selectively directs the flow of exhaust gas from the engine 82 and the flow of reformate gas from the fuel reformer 12 to either the right $NO_x$ trap 84 or the left $NO_x$ trap 86, or a combination of both traps 84, 86.

The control scheme for controlling the position of the diverter valve 88 may be designed in a number of different manners. For example, a sensor-based control scheme may be utilized. In such a case, the position of the diverter valve 88 is changed as a function of output from one or more sensors associated with the $NO_x$ traps 84, 86. For instance, regeneration of one of the $NO_x$ traps 84, 86 may commence when the output from a $NO_x$ sensor 154 is indicative of a predetermined $NO_x$ accumulation level within the online trap. More specifically, the $NO_x$ sensor 154 is positioned to sense the $NO_x$ content of exhaust gas passing through the fluid line 134. In such a downstream position relative to the $NO_x$ traps 84, 86, the sensor 154 may be used to monitor the $NO_x$ accumulation level of the $NO_x$ trap 84, 86 through which engine exhaust gas is being routed. As such, when the output from the $NO_x$ sensor 154 indicates that a particular $NO_x$ trap 84, 86 is in need of regeneration, the control unit 16 takes the trap 84, 86 in need of regeneration offline, and brings the other trap 84, 86 online in the manner described above.

Alternatively, a timing-based control scheme may be utilized in which the position of the diverter valve 88 is changed as a function of time. For instance, regeneration of the traps 84, 86 may be performed at predetermined timed intervals. In such a case, the $NO_x$ sensor 154 may be all together eliminated, or used merely as a "failsafe" to ensure that regeneration is not prematurely needed during a timed interval.

Moreover, an engine-mapped control scheme may be utilized in which the position of the diverter valve 88 is changed as a function of engine load over time. In particular, an engine map may be created which allows the control unit 16 to track the amount of $NO_x$ which has been created by the engine 82 based on engine load conditions. When the control unit 16 determines that the engine 82 has generated a predetermined amount of $NO_x$, with such an amount being trapped in the online trap 84, 86, the control unit 16 swaps the position of the diverter valve 88 thereby taking the trap offline for regeneration and routing exhaust gas through the other trap. As with the timing-based control scheme, the $NO_x$ sensor 154 may be all together eliminated from this control scheme, or used merely as a "failsafe" to ensure that regeneration is not prematurely needed during a mapped interval.

In regard to regeneration of the soot filter 96, use of a catalyzed filter allows for regeneration of the soot filter 96 to be performed primarily as a result of the introduction of heat from the engine's exhaust gas onto the filter 96. In other words, soot trapped in the soot filter 96 will be constantly ignited or otherwise purged from the filter 96 during operation of the engine.

However, in certain circumstances, the soot filter 96 may become impregnated with an amount of soot that cannot be removed by use of engine heat alone. For example, if the engine operating conditions were to cause an abnormally large amount of soot to be generated (and hence trapped by the filter 96), the soot filter 96 may not be able to completely purge the soot by use of exhaust gas heat alone. Moreover, if the engine 82 is operated in sustained transient conditions (e.g., startup, idle, etcetera), exhaust gas temperatures will be lowered thereby reducing regeneration efficiency of the soot filter 96. In such cases, or any other case in which the soot filter 96 becomes impregnated with an amount of soot that cannot be removed by use of exhaust gas heat alone, reformate gas from the fuel reformer 12 may be used to assist in regeneration of the filter 96.

Specifically, a quantity of reformate gas from the plasma fuel reformer 12 may be advanced into contact with the oxidation catalyst 94 to catalyze an oxidation reaction between the oxygen in the exhaust gas of the engine 82 and the reformate gas. Specifically, when the reformate gas is advanced into contact with the oxidation catalyst 94 in the presence of exhaust gas, the oxidation catalyst 94 catalyzes an oxidation reaction which converts the hydrogen gas present in the reformate gas and the oxygen present in the exhaust gases into, amongst other things, water. Moreover, the catalyst catalyzes an oxidation reaction which converts the carbon monoxide present in the reformate gas and the oxygen present in the exhaust gases into carbon dioxide. Both of these oxidation reactions are highly exothermic, and, as a result, produce heat that is transferred to the downstream-positioned soot filter 96. The heat, which may illustratively be in the range of 600–650 degrees Celsius, ignites and burns soot particles trapped in the particulate filter 96 thereby regenerating the filter 96.

It should be appreciated that such assisted regeneration of the soot filter 96 may be self-sustaining once initiated by heat from the exothermic reaction catalyzed by the oxidation catalyst 94. Specifically, once the soot filter 96 is heated to a temperature at which the soot particles trapped therein begin to ignite, the ignition of an initial portion of soot particles trapped therein can cause the ignition of the remaining soot particles much in the same way a cigar slowly burns from one end to the other. In essence, as the soot particles "burn," an amount of heat is released in the "burn zone." Locally, the soot layer (in the burn zone) is now much hotter than the immediate surroundings. As such, heat is transferred to the as yet un-ignited soot layer downstream of the burn zone. The energy transferred may be sufficient to initiate oxidation reactions that raise the un-ignited soot to a temperature above its ignition temperature. As a result of this, heat from the oxidation catalyst 94 may only be required to commence the regeneration process of the soot filter 96 (i.e., begin the ignition process of the soot particles trapped therein).

Moreover, since the soot filter 96 is impregnated on the surfaces thereof with a catalytic material such as, for example, a precious metal catalytic material, the ignition temperature of the soot particles trapped in the filter 96 is reduced. Indeed, depending on, amongst other things, the amount of catalytic material disposed on the filter 96 and the amount of accumulated soot particles, the ignition temperature of the soot particles may be lowered to an ignition temperature of between 300–600 degrees Celsius. In other exemplary implementations, the soot ignition temperature may be lowered to a temperature in the range of 300–550 degrees Celsius, more particularly in the range of 300–450 degrees Celsius, and even more particularly in the range of 300–350 degrees Celsius.

Soot particulate filters functioning in such a manner are described in copending, commonly assigned U.S. Provisional Patent Application Serial No. 60/375,134 entitled "Apparatus and Method for Regenerating a Particulate Filter of an Exhaust System of an Internal Combustion Engine" filed on Apr. 24, 2002 by Rudolf M. Smaling. The entirety of this provisional patent application (i.e., Serial No. 60/375, 134) is hereby incorporated by reference.

As shown in FIG. 3, the electronic control unit 16 is also electrically coupled to a pair of pressure sensors 156, 158 via a pair of signal lines 160, 162, respectively. The pressure sensors 156, 158 may be utilized to determine when the soot filter 96 is in need of regeneration assistance from the fuel reformer 12. In particular, the pressure sensors 156, 158 sense the pressure difference across the soot filter 96 in order to determine the soot accumulation level in the soot filter 96. Specifically, when the pressure drop across the soot filter 96 increases to a predetermined value, the electronic control unit 16 determines that the filter 96 is in need of regeneration and commences the assisted filter regeneration process. In lieu of such a dual sensor arrangement, a single pressure sensor on either side of soot filter 96 may be utilized, if desired. In such a configuration, the electronic control unit 16 would monitor when the pressure sensed by the single pressure sensor exceeded a predetermined upper threshold or was below a predetermined lower threshold, as opposed to monitoring the pressure drop across the soot filter 96. In any of these sensor configurations, when sensor output indicates that the soot filter 96 is in need of regeneration, the control unit 16 operates the fuel reformer 12 so as to generate a flow of reformate gas which is directed into contact with the oxidation catalyst 94 thereby commencing the assisted regeneration process described above.

It should be appreciated that the reformate gas may be advanced to the oxidation catalyst 94 via the $NO_x$ traps 84, 86 in a number of different manners. For example, the control unit 16 may operate the diverter valve 88 to divert reformate gas through a recently regenerated $NO_x$ trap 84, 86 thereby causing a predetermined portion of the reformate gas to pass through the $NO_x$ trap to the oxidation catalyst 94 without being "consumed" by the trap. As such, assisted regeneration of the soot filter 96 may be tied to regeneration of one of the $NO_x$ traps 84, 86. For example, if the soot filter 96 is in need of regeneration, the next regeneration cycle of one of the $NO_x$ traps 84, 86 may be extended. In other words, reformate gas from the fuel reformer 12 may continue to be advanced through the $NO_x$ trap even after the trap has been sufficiently regenerated thereby allowing amounts of reformate gas to reach the oxidation catalyst 94.

Reformate gas from the fuel reformer 12 may also be advanced to the oxidation catalyst 94 via a fluid line (not shown) which bypasses the $NO_x$ traps. In particular, a fluid line (not shown) may be coupled at one end to the outlet 76 of the fuel reformer 12 and at the other end to the fluid line 134 at a position upstream of the oxidation catalyst 94. A diverter valve (not shown) may be used to selectively direct reformate gas through either such a bypass line or through the fluid line 150 to the diverter valve 88 and hence the $NO_x$ traps 84, 86.

It should be appreciated that other assisted filter regeneration schemes utilizing reformate gas from the fuel reformer 12 are also contemplated. For example, the soot filter 96 may be regenerated with heat generated in the fuel reformer 12 by increasing the air-to-fuel ratio of the air/fuel mixture being processed by the fuel reformer 12 (e.g., using an air/fuel mixture having an oxygen-to-carbon ratio between 1.4–4.0, instead of typical 1.0 to 1.4). Such operation will convert some or all of the $H_2$ and CO in the reformate gas into heat at the reformer 12. This heat may then be carried through the system to the soot filter 96 to commence the regeneration process in a similar manner to as described above when commencement of the filter regeneration process is facilitated by heat from the oxidation catalyst. Such lean operation of the fuel reformer 12 may also be used to temporarily heat the $NO_x$ traps 84, 86 to their de-sulfurization temperature (e.g., ~600 degrees Celsius). As such, a scheme may be utilized in which heat from the fuel reformer 12 is used to both de-sulfurize the $NO_x$ traps 84, 86 and regenerate the soot filter 96.

It should also be appreciated that a pair of temperature sensors (not shown) may also be used on each side of the soot filter 96. In particular, the temperature sensors may be used to sense the temperature at the inlet 140 and outlet 146 of the soot filter 96 thereby allowing for the temperature of the exhaust gas entering and/or exiting the soot filter 96 to be determined. Such temperature readings may be used as a feedback mechanism to the control unit 16 to monitor regeneration of the filter 96. In particular, as described above, filter regeneration may be self-sustaining after being commenced by reformate gas from the fuel reformer 12. A temperature reading taken near the outlet 146 of the soot filter 96 may be used to ensure that combustion of the soot particles within the trap is being self-sustained in such a manner.

Figure 4:
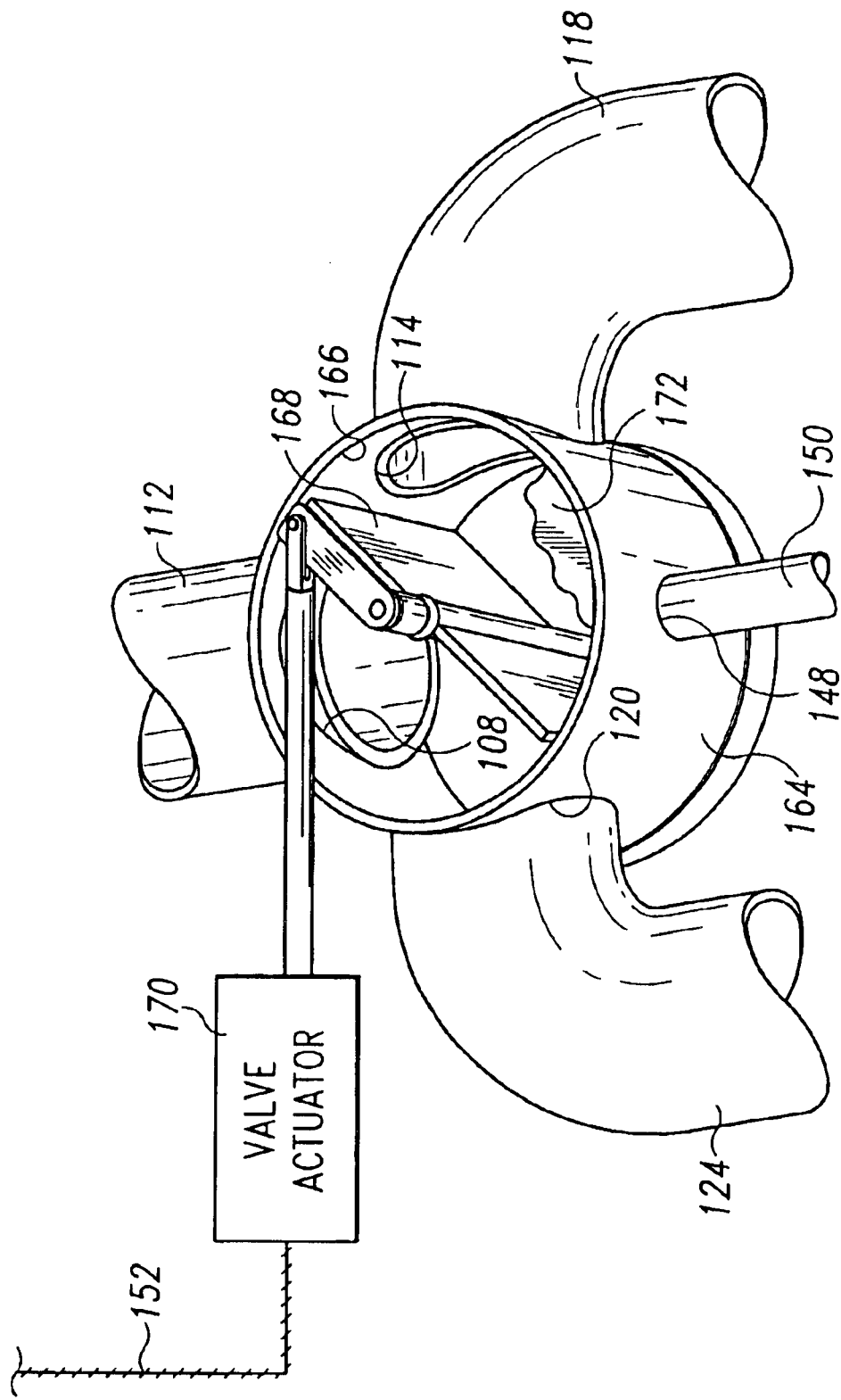
FIG. 4 is a fragmentary perspective view of the diverter valve of the emission abatement assembly of FIG. 3, note that a portion of the valve housing has been cutaway for clarity of description.
Figure 5:
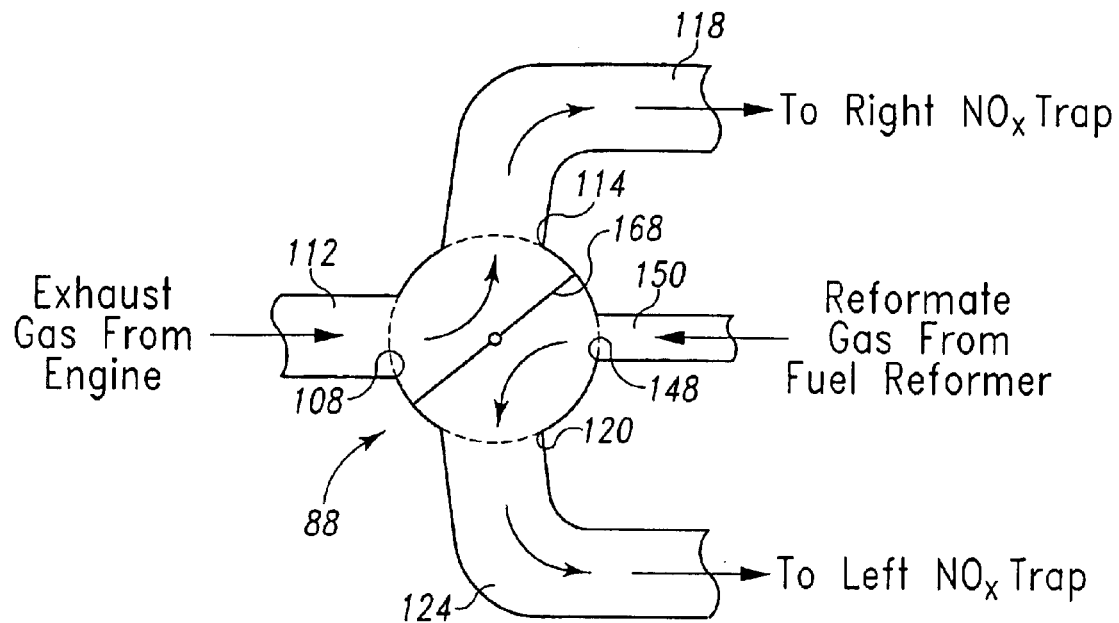
FIGS. 5 and 6 are simplified diagrammatic views of the diverter valve of FIG. 4 showing the valve in opposite valve positions.
Figure 6:
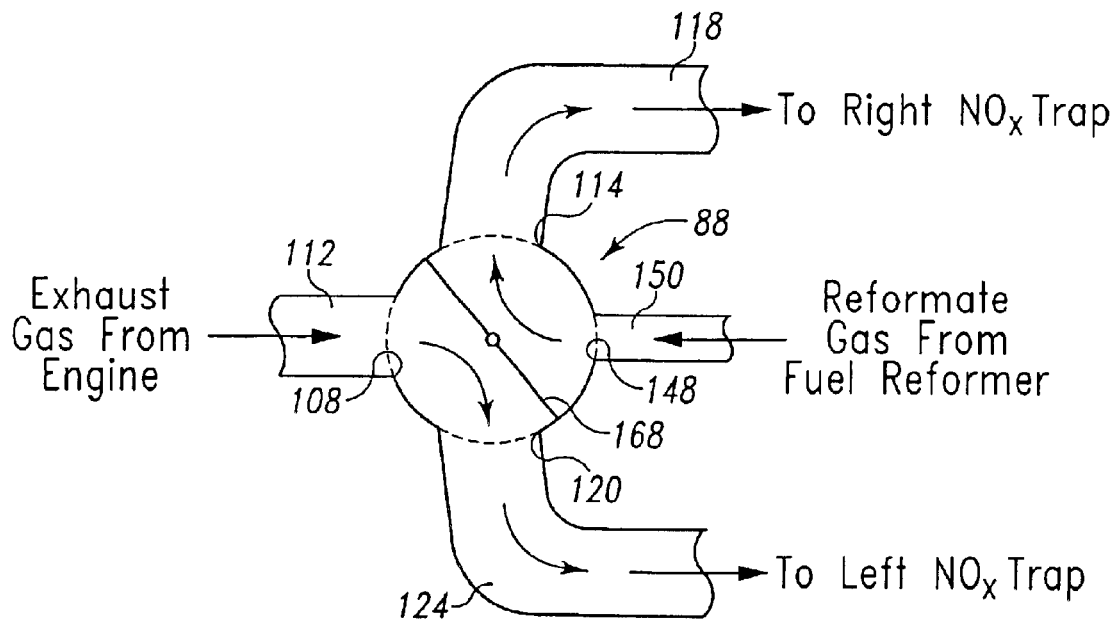

Referring now to FIGS. 4-6, there is shown the diverter valve 88 in greater detail. The diverter valve 88 includes a valve housing 164 having a valve chamber 166 defined therein. Note that in FIG. 4, all but a small portion of the top plate 172 of the valve housing 164 has been cut away for clarity of view into the valve chamber 166.

The exhaust gas inlet 108, the reductant fluid inlet 148, the right outlet 114, and the left outlet 120 are also defined in the valve housing 164. Although each of the inlets and outlets associated with the diverter valve 88 are exemplary embodied as an orifice defined in the walls of the valve housing 164, it should be appreciated that any or all of such inlets and outlets may, alternatively, be embodied to include a tube, coupling assembly, or other structure which extends through the wall of the housing 164.

The fluid lines 112, 118, 124, and 150 are secured to the valve housing 164 such that fluids conducted therein may be advanced into or out of the valve chamber 166 thereby fluidly coupling the valve chamber 166 to a particular component. In particular, as shown in FIG. 4, one end of the fluid line 112 (shown as a pipe in FIG. 4) extends through the exhaust gas inlet 108 of the valve housing 164 thereby fluidly coupling the valve chamber 166 to the exhaust manifold 110 of the engine 82. An end of the fluid line 118 (shown as a pipe in FIG. 4) extends through the right outlet 114 of the valve housing 164 thereby fluidly coupling the valve chamber 166 to the inlet 116 of the right $NO_x$ trap 84, whereas one end of the fluid line 124 (shown as a pipe in FIG. 4) extends through the left outlet 120 of the valve housing 164 thereby fluidly coupling the valve chamber 166 to the inlet 122 of the left $NO_x$ trap 86. An end of the fluid line 150 (shown as a pipe in FIG. 4) extends through the reductant fluid inlet 148 of the valve housing 164 thereby fluidly coupling the valve chamber 166 to the outlet 76 of the fuel reformer 12.

A valve member 168 in the form of a movable plate or "flap" is positioned in the valve chamber 166. The flap 168 is movable between a number of valve positions to selectively divert both exhaust gas from the engine 82 and reformate gas from the fuel reformer 12 to either one of the $NO_x$ traps 84, 86. Specifically, the flap 168 is positionable to direct engine exhaust gas to one of the $NO_x$ traps 84, 86 (i.e., the "online" trap) while directing reformate gas from the fuel reformer 12 to the other $NO_x$ trap 84, 86 (i.e., the "omine" trap).

For example, when positioned in the valve position shown in FIG. 5, the flap 168 diverts engine exhaust gas to the right $NO_x$ trap 84, while also diverting reformate gas from the fuel reformer 12 to the left $NO_x$ trap 86. Specifically, when positioned in the valve position of FIG. 5, the flap 168 fluidly couples the exhaust gas inlet 108 to the right outlet 114, but fluidly isolates the exhaust gas inlet 108 from the left outlet 120. When positioned in the valve position of FIG. 5, the flap 168 also fluidly couples the reductant fluid inlet 148 to the left outlet 120, but fluidly isolates the reductant fluid inlet 148 from the right outlet 114.

Conversely, when positioned in the valve position shown in FIG. 6, the flap 168 diverts engine exhaust gas to the left $NO_x$ trap 86, while also diverting reformate gas from the fuel reformer 12 to the right $NO_x$ trap 84. Specifically, when positioned in the valve position of FIG. 6, the flap 168 fluidly couples the exhaust gas inlet 108 to the left outlet 120, but fluidly isolates the exhaust gas inlet 108 from the right outlet 114. When positioned in the valve position of FIG. 6, the flap 168 also fluidly couples the reductant fluid inlet 148 to the right outlet 114, but fluidly isolates the reductant fluid inlet 148 from the left outlet 120.

The diverter valve 88 also includes a valve actuator 170 which, as alluded to above, is electrically coupled to the control unit 16 via the signal line 152. As such, the position of the diverter valve 88 is under the control of the control unit 16. As a result, the control unit 16, amongst its other functions, may selectively direct the flow of exhaust gas from the engine 82 and reformate gas from the plasma fuel reformer 12 to either the right $NO_x$ trap 84 or the left $NO_x$ trap 86. Specifically, the control unit 16 may generate control signals on the signal line 152 which cause the valve actuator 170 to selectively position the flap 168 in either the valve position of FIG. 5 or the valve position of FIG. 6. The valve actuator 170 may be embodied as any type of electrically-controlled actuator for moving the flap 168 in such a manner. For example, the valve actuator may be embodied as a linear solenoid or a stepper motor.

It should be appreciated that although the diverter valve 88 is herein described as a two position valve in which the flow of engine exhaust gas is completely interrupted to the offline trap 84, 86 and the flow of reformate gas is completely interrupted to the online trap, other control configurations of the diverter valve 88 are also contemplated. For example, a variable flow configuration is also contemplated in which a desired amount of engine exhaust gas may be directed through the offline trap 84, 86 and/or a desired amount of reformate gas may be directed through the online trap 84, 86. While such a configuration may not be particularly useful during regeneration of the $NO_x$ trap since it is usually desirable to have little to no flow of exhaust gas through the trap, such a configuration may be useful in the case of the aforedescribed assisted regeneration of the soot filter 96 since it may be desirable to have some degree of a flow of exhaust gases through the soot filter during regeneration thereof. In particular, during performance of the aforedescribed assisted filter regeneration scheme, it may be desirable to put a controlled flow of exhaust gas through the oxidation catalyst 94 to supply sufficient amounts of oxygen to sustain the oxidation reactions at the face of the catalyst 94 and to provide sufficient amounts of oxygen to burn the soot in the soot filter 96 with the heat generated by the catalyst 94.

The components of the diverter valve 88 may be constructed with any type of material suitable for withstanding the operating conditions to which the valve 88 is subjected. For example, the components of the diverter valve 88 may be constructed with any of the 300-series or 400-series stainless steels. In a specific implementation, the components of the diverter valve 88 may be constructed with either "304" stainless steel or "409" stainless steel. The components of the diverter valve 88 may also be constructed with other materials such as ceramic coated metals or the like.

Figure 7:
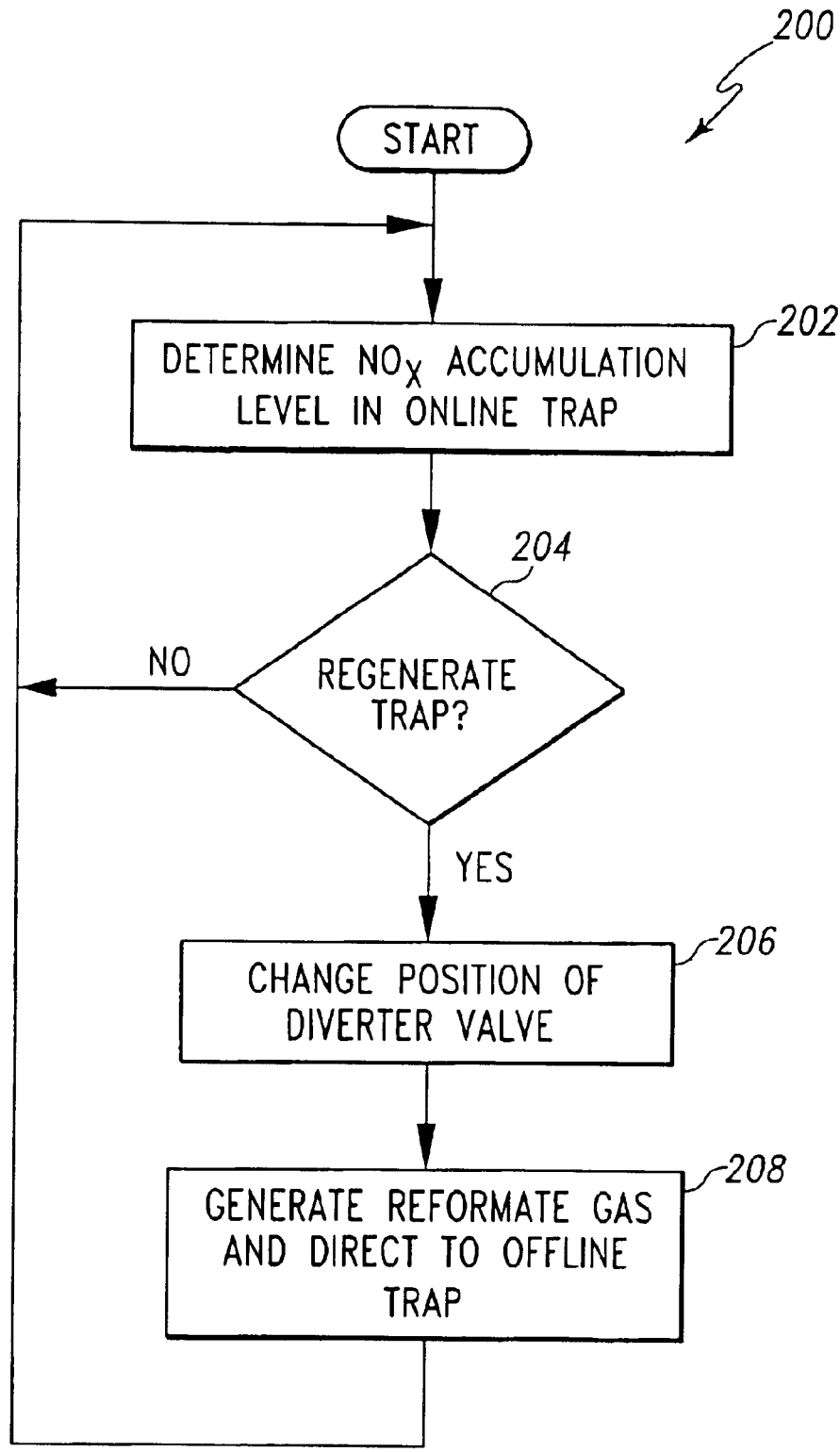
FIG. 7 is a flowchart of a control routine executed by the control unit of FIG. 3 to monitor and control regeneration the $NO_x$ traps.

Referring now to FIG. 7, there is shown a control routine 200 for controlling operation of the $NO_x$ traps during operation of the engine 14. The control routine 200 begins with step 202 in which the control unit 16 determines the $NO_x$ accumulation level in the online $NO_x$ trap 84, 86. As described above, the $NO_x$ accumulation in the online $NO_x$ trap 84, 86 may be determined in a number of different manners. For example, the $NO_x$ sensor 154 may be utilized in which case the control unit 16 scans or otherwise reads the signal,line coupling the sensor 154 to the control unit 16 to monitor output from the sensor 154. As described above, the output signals produced by the $NO_x$ sensor 154 are indicative of the $NO_x$ accumulation level of the online $NO_x$ trap 84, 86. Alternatively, the control unit 16 may determine the $NO_x$ accumulation level of the online $NO_x$ trap by determining the amount of time which has elapsed since the $NO_x$ trap was last regenerated. Moreover, the control unit 16 may also determine the accumulation level of the online trap by use of an engine-map technique. In any case, once the control unit 16 has determined the $NO_x$ accumulation level of the online $NO_x$ trap 84, 86, the control routine 200 advances to step 204.

In step 204, the control unit 16 determines if the $NO_x$ accumulation level within the online $NO_x$ trap 84, 86 necessitates regeneration of the trap. In particular, a predetermined accumulation level or "set point" may be established at which point the $NO_x$ trap is in need of regeneration. As such, in step 204, the control unit 16 determines if the $NO_x$ accumulation level of the online $NO_x$ trap equals or exceeds the set point. If the $NO_x$ accumulation level within the online $NO_x$ trap is below the set point, the control routine 200 loops back to step 202 to continue monitoring the $NO_x$ accumulation level within the online $NO_x$ trap 84, 86. However, if the $NO_x$ accumulation level within the online $NO_x$ trap 84, 86 is greater than or equal to the set point, a control signal is generated, and the control routine 200 advances to step 206.

In step 206, the control unit 16 redirects engine exhaust gas to the offline $NO_x$ trap 84, 86. In particular, the control unit 16 generates an output signal on the signal line 152 thereby causing the valve actuator 170 to move the diverter valve 88 from its current valve position to the opposite valve position. Such movement of the diverter valve 88 swaps the online/offline status of the $NO_x$ traps 84, 86. For example, if the right $NO_x$ trap 84 is online (and determined to be saturated beyond the set point in step 204), the control unit 16 generates an output signal on the signal line 152 which causes the diverter valve 88 to be moved from the valve position shown in FIG. 5 to the valve position shown in FIG. 6. Conversely, if the left $NO_x$ trap 86 is online (and determined to be saturated beyond the set point in step 204), the control unit 16 generates an output signal on the signal line 152 which causes the diverter valve 88 to be moved from the valve position shown in FIG. 6 to the valve position shown in FIG. 5. Once the position of the diverter valve 88 has been switched in such a manner, engine exhaust gas will be directed to the newly online $NO_x$ trap. The control routine 200 then advances to step 208.

In step 208, the control unit 16 regenerates the newly offline $NO_x$ trap 84, 86 (i.e., the $NO_x$ trap determined to be saturated beyond the set point in step 204). In particular, the control unit 16 commences operation of the fuel reformer 12 so as to generate reformate gas therewith. The reformate gas exiting the fuel reformer 12 is then advanced to the diverter valve 88 where, based on the valve's repositioning in step 206, the reformate gas is directed to the offline $NO_x$ trap. For example, if in step 206 the diverter valve 88 is positioned by the control unit 16 into the valve position shown in FIG. 5, reformate gas from the fuel reformer 12 is advanced to the left $NO_x$ trap 86. Conversely, if in step 206 the diverter valve 88 is positioned by the control unit 16 into the valve position shown in FIG. 6, reformate gas from the fuel reformer 12 is advanced to the right $NO_x$ trap 84. As such, reformate gas from the fuel reformer 12 is used to regenerate the offline $NO_x$ trap. The control routine 200 then loops back to step 202 to commence monitoring of the online $NO_x$ trap.

As described above, exhaust gas exiting the online $NO_x$ trap 84, 86 is directed through the oxidation catalyst 94 and thereafter the catalyzed soot filter 96. As a result, any "slip" from the $NO_x$ traps 84, 86 (e.g., hydrogen, hydrocarbons, or $H_2S$) is oxidized by the oxidation catalyst 94. Moreover, soot particles in the exhaust gas exiting the $NO_x$ traps 84, 86 are trapped in the soot filter 96. As described above, by use of a catalyzed filter, regeneration of the soot filter 96 will by in large be sustained by the introduction of beat from the engine's exhaust gas. In other words, soot trapped on the soot filter 96 will be constantly ignited or otherwise purged from the filter 96 during operation of the engine. However, in certain circumstances, the soot filter 96 may become impregnated with an amount of soot that cannot be removed by use of engine heat alone.

Figure 8:
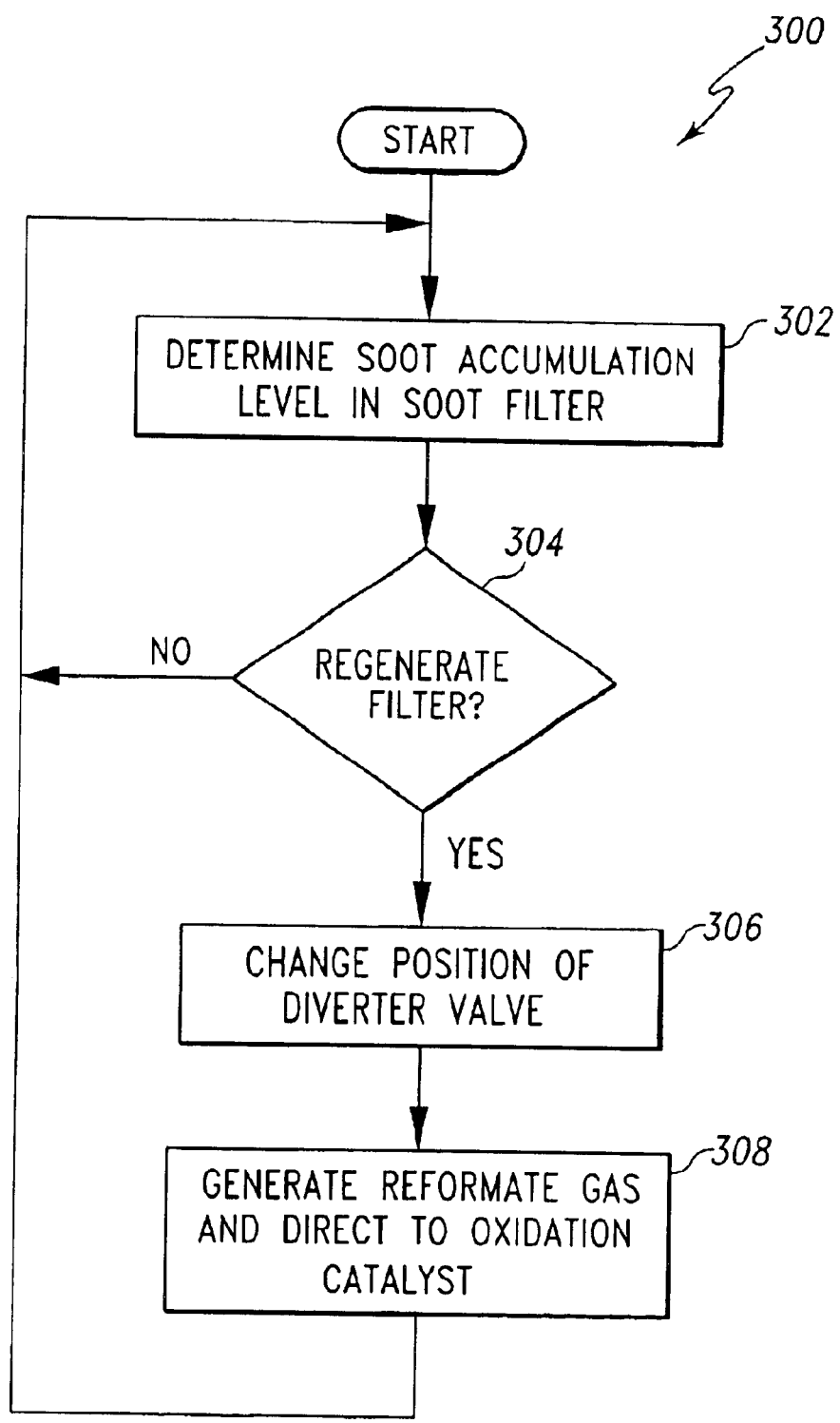
FIG. 8 is a flowchart of a control routine executed by the control unit of FIG. 3 to monitor and control regeneration of the soot filter.

To monitor for such situations, the control unit 16 executes a control routine 300, as shown in FIG. 8. The control routine 300 is executed contemporaneously with the control routine 200 of FIG. 7. The routine 300 begins with step 302 in which the control unit 16 determines the soot accumulation level in the soot filter 96. Specifically, the control unit 16 scans or otherwise reads the signal lines 160, 162 to monitor output from the pressure sensors 156, 158, respectively. As described above, the output signals produced by the pressure sensors 156, 158 reflect the pressure drop across the soot filter 96, and, as a result, are indicative of the soot accumulation level of the filter 96. Once the control unit 16 has determined the soot accumulation level in the soot filter 96, the control routine 300 advances to step 304.

In step 304, the control unit 16 determines if the soot accumulation level within the soot filter 96 necessitates regeneration of the filter 96. In particular, a predetermined accumulation level or "set point" may be established at which point the soot filter 96 is deemed to be in need of assistance in regard to regeneration thereof. For example, a set point in the form of a variable obtained from an engine map or a measured exhaust flow may be used. As such, in step 304, the control unit 16 determines if the soot accumulation level of the soot filter 96 equals or exceeds the set point. If the soot accumulation level within the soot filter 96 is below the set point, the control routine 300 loops back to step 302 to continue monitoring the soot accumulation level within the soot filter 96. However, if the soot accumulation level within the soot filter 96 is greater than or equal to the set point, a control signal is generated, and the control routine 300 advances to step 306.

In step 306, the control unit 16 positions the diverter valve 88 to allow for the advancement of reformate gas from the fuel reformer 12 to the oxidation catalyst 94. In particular, the control unit 16 generates an output signal on the signal line 152 thereby causing the valve actuator 170 to move the diverter valve 88 to a valve position in which reformate gas may be diverted through a recently regenerated $NO_x$ trap 84, 86 thereby causing a predetermined portion of the reformate gas to pass through the $NO_x$ trap to the oxidation catalyst 94 without being "consumed" by the trap. As described above, such advancement of the reformate gas through the trap may be performed as an extended $NO_x$ trap regeneration. Moreover, the reformate gas may be advanced to the catalyst via a dedicated bypass line. The control routine 300 then advances to step 308.

In step 308, the control unit 16 commences operation of the fuel reformer 12 so as to generate reformate gas therewith. The reformate gas exiting the fuel reformer 12 is then advanced into contact with the oxidation catalyst 94 to catalyze an oxidation reaction between the oxygen in the exhaust gas of the engine 82 and the reformate gas, as described in detail above. The heat generated by such a reaction is transferred to the downstream-positioned soot filter 96 thereby igniting and burning soot particles trapped in the particulate filter 96 so as to regenerate the filter 96. The control routine 300 then loops back to step 302 to commence monitoring of the soot filter 96.

Figure 9:
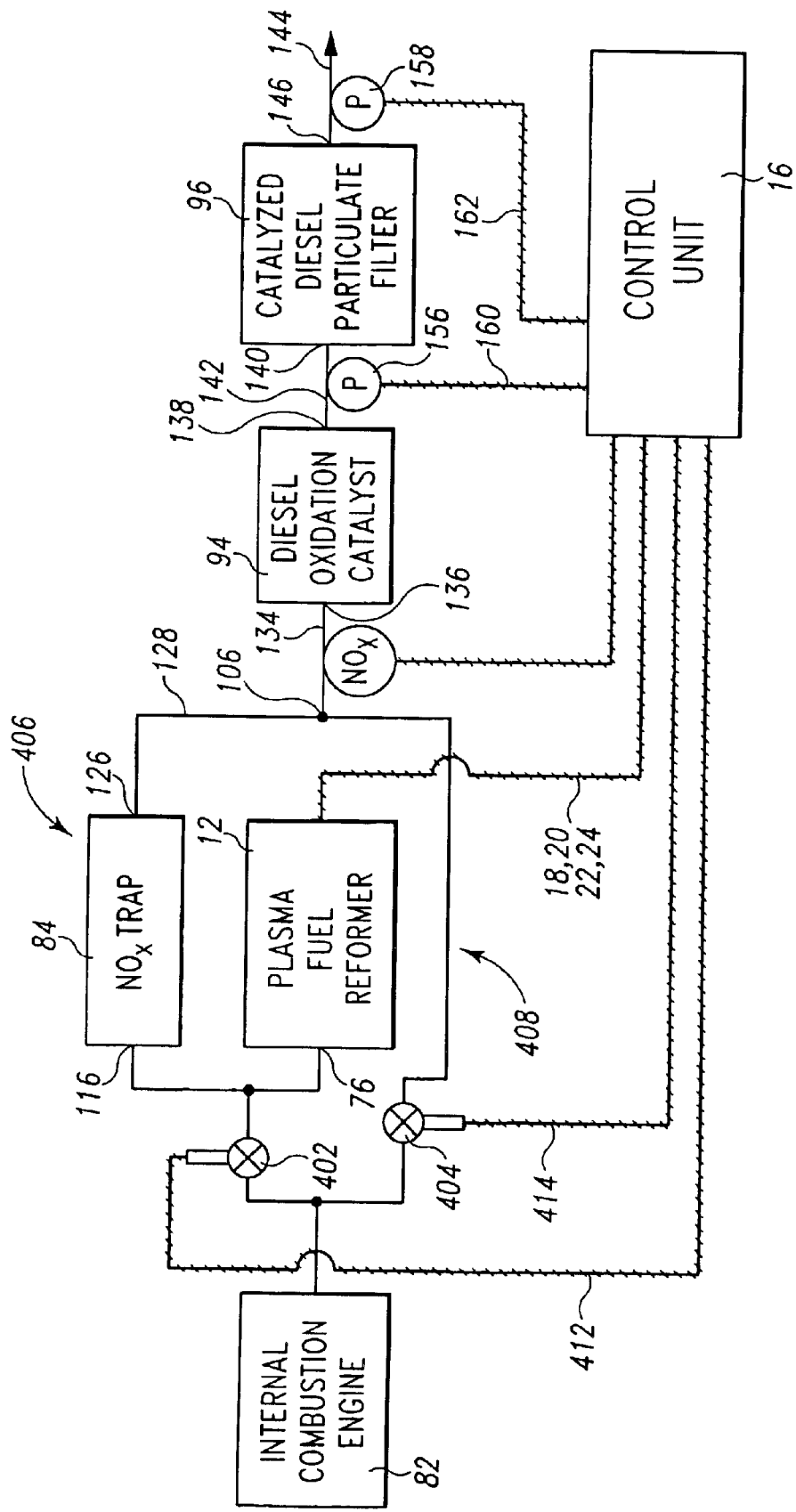
FIG. 9 is a view similar to FIG. 3, but showing a second embodiment of an emission abatement assembly.

Referring now to FIG. 9, there is shown an emission abatement assembly which is similar to the assembly shown in FIG. 3. The same reference numerals are used in FIG. 9 to designate common components which were previously discussed in regard to FIG. 3 with additional discussion thereof being unwarranted.

The system of FIG. 9 is somewhat similar to the system of FIG. 3 with the exception that only a single $NO_x$ trap 84 is used. The use of a single $NO_x$ trap may be particularly useful in the case of a vehicle retrofit application.

In the assembly of FIG. 9, a pair of exhaust diverter valves 402, 404 are utilized in lieu of the diverter valve 88. Use of the diverter valves 402, 404 allows for advancement of engine exhaust gas through either a trap flow path 406 or a bypass flow path 408. As shown in FIG. 9, the $NO_x$ trap 84 is positioned in the trap flow path 406, but is isolated from the bypass flow path 408. As such, when the diverter valve 402 is positioned in its open position and the diverter valve 404 is positioned in its closed position, exhaust gas from the engine 82 is directed along the trap flow path 406 and hence through the $NO_x$ trap 84. However, when the diverter valve 402 is positioned in its closed position and the diverter valve 404 is positioned in its open position, exhaust gas from the engine 82 is directed along the bypass flow path 408 and hence bypasses the $NO_x$ trap 84.

To operate in such a manner, the diverter valves 402, 404 are electrically coupled to the electronic control unit 16 via a pair of signal lines 412, 414, respectively. As such, the position of each of the diverter valves 402, 404 is under the control of the electronic control unit 16. Hence, the electronic control unit 16, amongst its other functions, selectively directs the flow of exhaust gas from the engine 82 to either the $NO_x$ trap 84 or the bypass flow path 408, or a combination thereof.

The control scheme for controlling the position of the diverter valves 402, 404 may be designed in a number of different manners. For example, a sensor-based control scheme similar to described herein in regard to FIG. 3 may be utilized. In such a case, the position of each of the diverter valves 402, 404 is changed as a function of output from the $NO_x$ sensor 154. As such, when the output from the $NO_x$ sensor 154 indicates that the $NO_x$ trap 84 is in need of regeneration, the control unit 16 operates the diverter valves 402, 404 to direct the exhaust gas from the engine 82 through the bypass flow path 408 thereby allowing for offline regeneration of the $NO_x$ trap 84 by use of reformate gas from the fuel reformer 12 in the manner described above.

Alternatively, a timing-based control scheme may be utilized in which the position of each of the diverter valves 402, 404 is changed as a function of time. For instance, regeneration of the $NO_x$ trap 84 may be performed at predetermined timed intervals. In such a case, the $NO_x$ sensor 154 may be all together eliminated, or used merely as a "failsafe" to ensure that regeneration is not prematurely needed during a timed interval.

Moreover, an engine-mapped control scheme may be utilized in which the position of each of the diverter valves 402, 404 is changed as a function of engine load over time. In particular, an engine map may be created which allows the control unit 16 to track the amount of $NO_x$ which has been created by the engine 82 based on engine load conditions. When the control unit 16 determines that the engine 82 has generated a predetermined amount of $NO_x$, with such an amount being trapped in the $NO_x$ trap 84, the control unit 16 operates the diverter valves 402, 404 to direct the exhaust gas from the engine 82 through the bypass flow path 408 thereby allowing for offline regeneration of the $NO_x$ trap 84 by use of reformate gas from the fuel reformer 12 in the manner described above. As with the timing-based control scheme, the $NO_x$ sensor 154 may be all together eliminated from this control scheme, or used merely as a "failsafe" to ensure that regeneration is not prematurely needed during a mapped interval.

In addition to the exemplary embodiments shown in FIGS. 3 and 9, other system configurations are also contemplated which incorporate the features of the present disclosure therein. For example, in lieu of the use of a single oxidation catalyst (e.g., the oxidation catalyst 94) and a single catalyzed soot filter (e.g., the soot filter 96) positioned in the recombined flow path downstream of both $NO_x$ traps 84, 86, each of the right flow path 102 and the left flow path 104 may be configured to include an oxidation catalyst and an uncatalyzed soot filter positioned downstream of the respective $NO_x$ traps. In other words, an oxidation catalyst (e.g., a diesel oxidation catalyst) and uncatalyzed soot filter (e.g., a soot filter which has not been impregnated with catalytic material) may be positioned in each of the parallel flow paths at a position downstream of each $NO_x$ trap. Such an arrangement advantageously allows for filter regeneration in the presence of a significantly smaller engine exhaust flow thereby lowering the amount of reformate gas required to regenerate each soot filter relative to use of a soot filter that is regenerated in the presence of the entire engine exhaust flow.

As can be seen from the foregoing description, the concepts of the present disclosure provide numerous features and advantages relative to other systems. For example, amongst other things, the concepts of the present disclosure allow for the use of a single fuel reformer to regenerate a number of different exhaust treatment devices. In such a way, multiple exhaust compounds (e.g., $NO_x$ and soot) can be removed from the exhaust gas flow by use of a single reformer.

Moreover, the configuration and positioning of the soot filter enhances the reliability of the emission abatement assembly. Indeed, use of a catalyzed filter allows for soot filter regeneration to be performed primarily without assistance from the fuel reformer. Moreover, positioning the soot filter downstream of the $NO_x$ traps, as opposed to visa versa, eliminates the possibility of damage to the $NO_x$ traps as a result of heat from an assisted filter regeneration cycle.

Further, by use of the diverter valve of FIGS. 3-6, a single valve may be used in place of numerous valves. Indeed, a single valve may be used in lieu of one or more valves for diverting exhaust gas from the engine between the two traps and one or more valves for diverting reformate gas between the two traps.

While the disclosure is susceptible to various modifications and alternative forms, specific exemplary embodiments thereof have been shown by way of example in the drawings and has herein be described in detail. It should be understood, however, that there is no intent to limit the disclosure to the particular forms disclosed, but on the contrary, the intention is to cover all modifications, equivalents, and alternatives falling within the spirit and scope of the disclosure.

There are a plurality of advantages of the present disclosure arising from the various features of the apparatus, systems, and methods described herein. It will be noted that alternative embodiments of the apparatus, systems, and methods of the present disclosure may not include all of the features described yet still benefit from at least some of the advantages of such features. Those of ordinary skill in the art may readily devise their own implementations of apparatus, systems, and methods that incorporate one or more of the features of the present disclosure and fall within the spirit and scope of the present disclosure.

For example, although the $NO_x$ abatement devices are herein described as $NO_x$ traps, and have numerous advantages thereby in regard to the disclosed systems, certain of such advantages may also be achieved by use of other $NO_x$ abatement devices. For example, SCR devices may be used in certain system configurations in lieu of the $NO_x$ traps described herein.

Moreover, although the diverter valve 88 is herein described in regard to the directing of engine exhaust gas, along with a reductant fluid in the form of reformate gas from a fuel reformer, it should be appreciated that the valve 88 may be used in regard to other types of reductant fluids. For example, the diverter valve 88 may be used to direct reductant fluids in the form of reductant gases which originate from sources other than onboard reformers such as tanks or other storage devices.

The diverter valve 88 may also be used to direct reductant fluids in forms other than gases. For example, in certain embodiments, the diverter valve 88 may be used to direct reductant fluids in the form of liquid hydrocarbon fuels. For instance, the diverter valve 88 may be used to direct reductant fluid in the form of untreated diesel fuel. In such a case, for example, the untreated diesel fuel may be injected into the valve 88 (e.g., through the reductant fluid inlet 148) by use of a fuel injector assembly (including a fuel injector assembly that atomizes the diesel fuel prior to or during injection thereof).

What is claimed is:

1. A method of operating an emission abatement assembly having a first $NO_x$ trap, a second $NO_x$ trap, and a catalyzed soot filter, the method comprising the steps of:

determining if regeneration of the first $NO_x$ trap is to be performed and generating a regenerate-first-trap signal in response thereto, operating a fuel reformer so as to produce and advance reformate gas to the first $NO_x$ trap in response to generation of the regenerate-first-trap signal, advancing exhaust gas from an internal combustion engine through the second $NO_x$ trap in response to generation of the regenerate-first-trap signal, and advancing exhaust gas exiting the second $NO_x$ trap through the catalyzed soot filter.

2. The method of claim 1, further comprising the steps of:

determining if regeneration of the second $NO_x$ trap is to be performed and generating a regenerate-second-trap signal in response thereto, operating the fuel reformer so as to produce and advance reformate gas to the second $NO_x$ trap in response to generation of the regenerate-second-trap signal, advancing exhaust gas from the internal combustion engine through the first $NO_x$ trap in response to generation of the regenerate-second-trap signal, and advancing exhaust gas exiting the first $NO_x$ trap through the catalyzed soot filter.

3. The method of claim 2, wherein:

the step of advancing exhaust gas from the internal combustion engine through the first $NO_x$ trap comprises positioning a diverter valve in a first valve position so as to (i) direct exhaust gas from an exhaust manifold of the internal combustion engine to the first $NO_x$ trap, and (ii) isolate the second $NO_x$ trap from the exhaust manifold, and the step of advancing exhaust gas from the internal combustion engine through the second $NO_x$ trap comprises positioning the diverter valve in a second valve position so as to (i) direct exhaust gas from the exhaust manifold to the second $NO_x$ trap, and (ii) isolate the from first $NO_x$ trap from the exhaust manifold.

4. The method of claim 2, wherein:

the step of advancing exhaust gas from the internal combustion engine through the first $NO_x$ trap comprises positioning a diverter valve in a first valve position so as to (i) direct exhaust gas from an exhaust manifold of the internal combustion engine to the first $NO_x$ trap, and (ii) reduce exhaust gas flow from the exhaust manifold to the second $NO_x$ trap, and the step of advancing exhaust gas from the internal combustion engine through the second $NO_x$ trap comprises positioning the diverter valve in a second valve position so as to (i) direct exhaust gas from the exhaust manifold to the second $NO_x$ trap, and (ii) reduce exhaust gas flow from the exhaust manifold to the first $NO_x$ trap.

5. The method of claim 1, further comprising the step of combusting soot trapped in the catalyzed soot filter with exhaust gas heat from the internal combustion engine.

6. The method of claim 5, further comprising the steps of:

determining if soot accumulation in the catalyzed soot filter exceeds a predetermined threshold and generating a regenerate-filter signal in response thereto, and operating the fuel reformer so as to produce reformate gas to facilitate regeneration of the catalyzed soot particulate filter in response to generation of the regenerate-filter signal.

7. The method of claim 6, wherein the step of operating the fuel reformer so as to produce reformate gas to facilitate regeneration of the catalyzed soot particulate comprises:

advancing reformate gas and in the presence of oxygen through an oxidation catalyst to generate an exothermic reaction, and igniting soot trapped in the catalyzed soot filter with heat from the exothermic reaction.

8. An emission abatement assembly, comprising:

a first $NO_x$ trap having an inlet and an outlet, a second $NO_x$ trap having an inlet and an outlet, the second $NO_x$ trap being positioned in a parallel flow arrangement with the first $NO_x$ trap, a diverter valve fluidly coupled to both the inlet of the first $NO_x$ trap and the inlet of the second $NO_x$ trap, a catalyzed soot filter having an inlet fluidly coupled to the outlet of the first $NO_x$ trap and the outlet of the second $NO_x$ trap, and a fuel reformer for reforming hydrocarbon fuel into reformate gas, the fuel reformer being fluidly coupled to the diverter valve.

9. The emission assembly of claim 8, further comprising an oxidation catalyst having an inlet and an outlet, wherein (i) the inlet of the oxidation catalyst is fluidly coupled to both the outlet of the first $NO_x$ trap and the outlet of the second $NO_x$ trap, and (ii) the outlet of the oxidation catalyst is fluidly coupled to the inlet of the catalyzed soot filter.

10. The emission abatement assembly of claim 8, further comprising an electronic control unit electrically coupled to the fuel reformer and the diverter valve, the electronic control unit being configured to control operation of both the fuel reformer and the diverter valve so as to (i) advance reformate gas to the first $NO_x$ trap during a first period of time, and (ii) advance reformate gas to the second $NO_x$ trap during a second period of time.

11. The emission abatement assembly of claim 8, wherein the fuel reformer comprises a plasma fuel reformer.

12. The emission abatement assembly of claim 8, wherein the catalyzed soot filter is configured to (i) trap soot particles from exhaust gas advanced therethrough, and (ii) combust the soot particles in the presence of exhaust gas heat.

13. An emission abatement assembly, comprising:

a first $NO_x$ trap, a second $NO_x$ trap, a diverter valve configured to divert engine exhaust gas between the first $NO_x$ trap and the second $NO_x$ trap, and a catalyzed soot filter positioned downstream of the first $NO_x$ trap and the second $NO_x$ trap, a fuel reformer fluidly coupled to both the first $NO_x$ trap and the second $NO_x$ trap, and an electronic control unit electrically coupled to the fuel reformer, the electronic control unit comprising (i) a processor, and (ii) a memory device electrically coupled to the processor, the memory device having stored therein a plurality of instructions which, when executed by the processor, causes the processor to:

(a) determine if regeneration of the first $NO_x$ trap is to be performed and generate a regenerate-first-trap signal in response thereto, (b) operate a fuel reformer so as to produce and advance reformats gas to the first $NO_x$ trap in response to generation of the regenerate-first-trap signal, and (c) operate the diverter valve to divert exhaust gas through the second $NO_x$ trap in response to generation of the regenerate-first-trap signal.

14. The emission abatement assembly of claim 13, wherein the plurality of instructions, when executed by the processor, further cause the processor to:

(a) determine if regeneration of the second $NO_x$ trap is to be performed and generate a regenerate-second-trap signal in response thereto, (b) operate the fuel reformer so as to produce and advance reformate gas to the second $NO_x$ trap in response to generation of the regenerate-second-trap signal, and (c) operate the diverter valve to divert exhaust gas through the first $NO_x$ trap in response to generation of the regenerate-second-trap signal.

15. The emission abatement assembly of claim 13, wherein the fuel reformer comprises a plasma fuel reformer.

16. The emission abatement assembly of claim 13, wherein the catalyzed soot filter is configured to (i) trap soot particles from exhaust gas advanced therethrough, and (ii) combust the soot particles in the presence of exhaust gas heat.

17. The emission abatement assembly of claim 13 further comprising an oxidation catalyst fluidly positioned between the catalyzed soot filter and the first and second $NO_x$ traps, wherein the plurality of instructions, when executed by the processor, further cause the processor to:

(a) determine if soot accumulation in the catalyzed soot filter exceeds a predetermined threshold and generate a regenerate-filter signal in response thereto, and (b) operate the fuel reformer so as to produce reformate gas to facilitate regeneration of the catalyzed soot particulate filter in response to generation of the regenerate-filter signal.

18. The emission abatement assembly of claim 13, further comprising an oxidation catalyst fluidly positioned between the catalyzed soot filter and the first and second $NO_x$ traps, wherein the plurality of instructions, when executed by the processor, further cause the processor to:

(a) determine if soot accumulation in the catalyzed soot filter exceeds a predetermined threshold and generate a regenerate-filter signal in response thereto, and (b) operate the fuel reformer so as to produce and advance reformate gas through the oxidation catalyst thereby generating an exothermic reaction the heat from which ignites soot trapped in the catalyzed soot filter.

\* \* \* \* \*

UNITED STATES PATENT AND TRADEMARK OFFICE
CERTIFICATE OF CORRECTION

PATENT NO. : 6,843,054 B2
DATED : January 18, 2005
INVENTOR(S) : William Taylor, III, Samuel N. Crane, Jr., and Yougen Kong It is certified that error appears in the above-identified patent and that said Letters Patent is hereby corrected as shown below:

Column 21,
Line 23, "reformats" is changed to "reformate."

Signed and Sealed this

Seventeenth Day of May, 2005

JON W. DUDAS
*Director of the United States Patent and Trademark Office*